(12) United States Patent
Callahan

(10) Patent No.: US 11,688,017 B1
(45) Date of Patent: *Jun. 27, 2023

(54) COMPUTER SYSTEM AND METHOD FOR DETECTING, EXTRACTING, WEIGHING, BENCHMARKING, SCORING, REPORTING AND CAPITALIZING ON COMPLEX RISKS FOUND IN BUY/SELL TRANSACTIONAL AGREEMENTS, FINANCING AGREEMENTS AND RESEARCH DOCUMENTS

(71) Applicant: James Callahan, Greenwich, CT (US)

(72) Inventor: James Callahan, Greenwich, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/553,949

(22) Filed: Dec. 17, 2021

Related U.S. Application Data

(63) Continuation of application No. 17/061,650, filed on Oct. 2, 2020, now Pat. No. 11,205,233.

(60) Provisional application No. 62/909,494, filed on Oct. 2, 2019.

(51) Int. Cl.
| | |
|---|---|
| *G06Q 40/08* | (2012.01) |
| *G06F 16/9538* | (2019.01) |
| *G06Q 40/06* | (2012.01) |
| *G06F 16/955* | (2019.01) |
| *G06Q 10/10* | (2023.01) |
| *G06F 16/958* | (2019.01) |
| *G06Q 30/018* | (2023.01) |
| *G06Q 40/12* | (2023.01) |
| *G06Q 40/03* | (2023.01) |
| *G06V 30/40* | (2022.01) |
| *G06V 30/10* | (2022.01) |

(52) U.S. Cl.
CPC ......... *G06Q 40/08* (2013.01); *G06F 16/9538* (2019.01); *G06F 16/9558* (2019.01); *G06F 16/986* (2019.01); *G06Q 10/103* (2013.01); *G06Q 30/018* (2013.01); *G06Q 40/03* (2023.01); *G06Q 40/06* (2013.01); *G06Q 40/12* (2013.12); *G06V 30/10* (2022.01); *G06V 30/40* (2022.01)

(58) Field of Classification Search
CPC .................................................. G06Q 40/08
USPC .......................................................... 705/4
See application file for complete search history.

(56) References Cited

U.S. PATENT DOCUMENTS

| | | | |
|---|---|---|---|
| 2012/0030079 A1* | 2/2012 | Slater .................... | G06Q 40/03 705/35 |
| 2018/0121816 A1* | 5/2018 | Donoho ................ | G06Q 40/02 |

* cited by examiner

*Primary Examiner* — Robert R Niquette
(74) *Attorney, Agent, or Firm* — K&L Gates LLP

(57) ABSTRACT

Computer-implemented systems and methods enhance a user's sophistication as she/he reviews complex information sources using specialized detective tools provided by a user interface of the computer system. The specialized investigative inquiries are stored in a database and are particularly tailored a priori by a subject-matter content designer for the type of documents being reviewed for risk and opportunity. The investigative scripts are organized into to a path of risk-related subjects or topics, and within each path of subjects/topics the investigative scripts are organized into a specialized inquiry or flow chart.

12 Claims, 19 Drawing Sheets

Fig. 5

| Doc ID | Product | Bank | Effective Date | Investigation | Question ID | Response | Date |
|---|---|---|---|---|---|---|---|
| 00004 | RMBS | ABC | 1/1/2019 | Governance | 001 | p. 73 | 1/1/2019 |
| 00004 | RMBS | ABC | 1/1/2019 | Governance | 002 | p. 74 | 1/1/2019 |
| 00004 | RMBS | ABC | 1/1/2019 | Trustee Risk | 001 | p. 108 | 1/1/2019 |
| 00004 | RMBS | ABC | 1/1/2019 | Trustee Risk | 002 | p. 109 | 1/1/2019 |
| 00003 | RMBS | ABC | 12/28/2018 | Governance | 001 | p. 73 | 12/28/2018 |
| 00003 | RMBS | ABC | 12/28/2018 | Governance | 002 | p. 74 | 12/28/2018 |
| 00003 | RMBS | ABC | 12/28/2018 | Trustee Risk | 001 | p. 108 | 12/28/2018 |
| 00003 | RMBS | ABC | 12/28/2018 | Trustee Risk | 002 | p. 109 | 12/28/2018 |
| 00002 | RMBS | DEF | 12/28/2018 | Governance | 001 | p. 31 | 12/20/2018 |
| 00002 | RMBS | DEF | 12/28/2018 | Governance | 002 | p. 33 | 12/20/2018 |
| 00002 | RMBS | DEF | 12/28/2018 | Trustee Risk | 001 | p. 97 | 12/20/2018 |
| 00002 | RMBS | DEF | 12/28/2018 | Trustee Risk | 002 | p. 98 | 12/20/2018 |
| 00001 | RMBS | ABC | 12/17/2018 | Governance | 001 | p. 72 | 12/17/2018 |
| 00001 | RMBS | ABC | 12/17/2018 | Governance | 002 | p. 71 | 12/17/2018 |
| 00001 | RMBS | ABC | 12/17/2018 | Trustee Risk | 001 | p. 105 | 12/17/2018 |
| 00001 | RMBS | ABC | 12/17/2018 | Trustee Risk | 002 | p. 106 | 12/17/2018 |

INTELLIGENCE, MEASUREMENT AND BENCHMARKING SYSTEM (IMBS)
for Global Financial Products

| | | | |
|---|---|---|---|
| | (for EACH pieces of underlying financial collateral) | | |
| | | | Detail Report |
| 2 | 46.02 Special (Notable) Issues Related to the Floating Rate Index Transition - Original Contracts (Loan Level for EACH piece) | COMPLETED(79) | Macro Report | Detail Report | 0 |
| 3 | 46.03 Index Transition Leadership and Implementation Considerations - Original Collateral Contracts (Loan Level for EACH piece) | COMPLETED(66) | Macro Report | Detail Report | 32 |
| 4 | 46.06 Third Party - Benchmark Replacement Agent or an equivalently named third party, if any | COMPLETED(72) | Macro Report | Detail Report | 1 |
| 5 | 46.07 IBOR Transition Legal Requirements, Responsibilities and Rights | COMPLETED(67) | Macro Report | Detail Report | 24 |
| 6 | 46.08 Financial Collateral and Issued Certificate Coupons | COMPLETED(69) | Macro Report | Detail Report | 20 |
| 7 | 46.09 Existing/Legacy Benchmark Index | COMPLETED(12) | Macro Report | Detail Report | 70 |
| 8 | 46.10 IBOR Transition Mechanics | COMPLETED(67) | Macro Report | Detail Report | 84 |
| 9 | 46.11 IBOR Transition Mathematics | COMPLETED(80) | Macro Report | Detail Report | 74 |
| 10 | 46.12 Post Transition Replacement Benchmark Index | COMPLETED(67) | Macro Report | Detail Report | 75 |
| 11 | 46.13 Floating Rate Hedge Mechanics | COMPLETED(12) | Macro Report | Detail Report | 0 |
| 12 | 46.14 IBOR Announcements | COMPLETED(80) | Macro Report | Detail Report | 14 |

| Assignment Date | 5/12/2020 | Subject Files Completed | 12 | 100% | Peer Group Type | USRMBS |
|---|---|---|---|---|---|---|
| Analysis Completion Date | 5/12/2020 | Subject Files Started But Not Completed | 0 | 0% | Peer group Analysis AS-OF Date Window | 2Q12-2019 |
| Days to Perform Assignment | 2 | Subject Files Not Started | 0 | 0% | Number of Securities Reviewed in This Peer Group | 10 |
| Days to Complete Assignment | 0 | | | | | |

Confidential

COMPUTER SYSTEM AND METHOD FOR DETECTING, EXTRACTING, WEIGHING, BENCHMARKING, SCORING, REPORTING AND CAPITALIZING ON COMPLEX RISKS FOUND IN BUY/SELL TRANSACTIONAL AGREEMENTS, FINANCING AGREEMENTS AND RESEARCH DOCUMENTS

PRIORITY CLAIM

The present application is a continuation of U.S. application Ser. No. 17/061,650, filed Oct. 2, 2020, now U.S. Pat. No. 11,205,233, issued Dec. 21, 2021, which claims priority to U.S. provisional patent application Ser. No. 62/909,494, filed Oct. 2, 2019, with the same title and inventor as stated above, and which is incorporated herein by reference in its entirety.

BACKGROUND

The written agreements (contracts) that document a buy/sell transaction and financing agreement are usually bespoke, but not always. These contracts can be applicable to equity, debt, derivative and other financial oriented transactions. As the financial issue at hand grows in value, complexity and risk, the documents tend to get longer and more complex. Some transactional agreements can include more than one million pages of contract related documents. Through a quick reference to another document or web site, that document or web site could include a million pages of content as well. Some contracts have two parties while other contracts could have many parties. Although all parties to an individual transaction matter tend to review the contract document for accuracy, the contracts are usually drafted initially by one party who seeks to bias the contractual rights and privileges to their side. This is often achieved by scribing significant deal points in a descriptive or prescriptive fashion. As a further commercial tactic, however, the contract terms often include (1) intentionally conflicting language in a later section, (2) "collars" on when certain provisions are in-force and/or (3) intentional drafting omissions (that can be used later favorably in the event of a future dispute). These drafting complexities can arise at multiple levels; at the transaction level, the specified asset level, at the borrowing entity level, at the borrowing entity's sponsor level, at the parent company level, etc. Some transactions can include or reference millions pages of contract documents, thousands of Internet links, hundreds of references to third party items, audio or video interviews with numerous people, call center transcripts, distributed ledge data elements etc. The scale of the information sources related to a transactional or financial matter can be massive, found in many locations and may change over time. When they are coupled with the complexities of the contractual arrangement, there can be tens of millions of risk concerns or reward opportunities.

Sometimes the parties only have a limited time, such as 48 hours, to make a lending/investing decision to participate in a transaction or not. This requires them to analyze risk associated with the transaction and use risk analysis intuition to decide if they wish to participate in the transaction. Detailed analysis often leads to more informed decision-making.

On a buy/sell transaction, the contract and regulatory documents and filings to memorialize that buy/sell or financing agreement could relate to a complex global mega-mergers all the way down to local receipts exchanged at the grocery counter.

On the financing side, a corporation or individual may borrow funds on a secured or unsecured basis. The agreements to evidence that borrowing could be extremely dense and take different forms; loan, receivable contract, custom IOU, bond etc.

On the financing side and away from a government, corporation or person financing a specific asset, there is a specialized financing tool when large amount of loans or receivables are bundled and financed as a collective whole. In this embodiment, the parties bundle large quantities of loans and sell them in bulk to others to frequently book a gain or loss on that sale or to a special purpose trust who securitizes them. Securitization often involves large pools of debt (IOU) instruments and is one type of financing transaction that typically has complex contracts and documentation. Securitization is the financial practice of pooling various types of contractual debt instruments, such as mortgages, unsecured marketplace debt instruments, auto loans or credit card debt obligations. In that practice, they sell their ownership rights (including the related cash flows) to a third party who then finances that purchase through the issuance of securities to investors, which may be in the form of bonds, pass-through securities, participations or collateralized debt/loan obligations (CDOs) to name a few of the options. Investors are repaid from the principal and interest cash flows collected from the underlying debt instruments and redistributed through the capital structure of the new financing vehicle. Securities backed by mortgage receivables are called mortgage-backed securities (MBS), while those backed by other types of receivables are asset-backed securities (ABS) to name a select few.

A typical securitization process flow, in this case for MBS, is shown in FIG. 1. The Borrower is an individual or organization which obtains a loan, in this case a mortgage, from a financial institution/lender (e.g., a bank) and pays the monthly payments on the loan for the full term of the loan. Sometimes, a Mortgage Broker acts as a facilitator between a borrower and the lender. The financial institution/lender then sells the loan assets to the Issuer, which often includes transactional contracts. The Issuer typically is a bankruptcy-remote Special Purpose Entity (SPE) formed to facilitate the securitization financing process and to issue the securities to the investors. The Issuer then sells the securities as bonds, etc. to the Investors. The securities are backed by the borrowers' loans with the monthly payments on the securities funded from the monthly payments from the borrowers on the loans.

The securitization often has multiple parties that work together over the term of a securitization to operate the SPE. As an example, the Servicer is an entity responsible for collecting the loan payments from the borrowers and for remitting these payments to the issuer for further distribution to the investors. The servicer is generally obligated to maximize the payments from the borrowers to the issuer, and is responsible for handling performing as well as delinquent loans and the related foreclosures and repossessions. The Trustee is a third party appointed to represent the investors' interests in the securitization. The trustee undertakes specified duties to help ensure that the securitization operates as set forth in the securitization documents, which may include determinations about the servicer's compliance with established servicing criteria. Unfortunately, many SPEs do not include a senior party to oversee the ongoing administration of the SPE. This introduces many risks that can materially impact an investment's cash flow and in turn value. There are usually many more parties than just the Trustee and servicer.

There are many information sources or data items (such as agreements) included in such a securitization. These data items could include the borrowers' loan documents, the purchase, sale and/or pledge documents between the lender(s) and the issuer/SPV that transfer the rights to the ongoing payments from the borrowers to the issuer/SPV. There is also typically a Pooling and Servicing Agreement (PSA) and/or other operating agreements that define how secured assets such as loans are combined in the securitization, the administration and servicing of the loans, representations and warranties, and permissible loss mitigation strategies that the servicer can perform in event of loan default. The Underwriter administers the placement of the securities to investors. Finally, the securitization transaction may include credit enhancement (designed to decrease the credit risk of the various parts of the structure) provided by an independent third party, such as the Credit Enhancement Provider, in the form of letters of credit or guarantees. Some of these documents include "risk" disclosure sections that can be more than 100 pages. A securitization with 10,000 underlying loans that act as collateral could have 1 million+ pages of documents.

Each securitization may include risk, such as the borrower not making the loan payments, and the asset backing a loan becoming impaired, etc. The securitization documents are supposed to explain the parties' roles in the event of risk contingencies, particularly the service provider's roles. However, the securitization documents may not adequately address the risk contingencies and/or introduce new risks due to inconsistent or omitted contractual provisions that must be applied to the SPE until the last loan is removed from the SPE. Inadequate securitization documents can materially increase the cash flow variability and loss severity for the investors and increase their secondary price volatility.

Corporate debt is another type of financing instrument. When a company borrows money outright or pledges an asset to facilitate a financing, the details of the pledged asset becomes important. An asset could start during a construction or manufacturing period, a user stabilization period or a long-term usage period. The documents related to this evolution can be voluminous and risks and rewards change as the borrowing company and the asset matures.

The information sources to memorialize the various aspects of the transaction are not static. There are numerous instances that documents, filings, verbal agreements etc. can be amended, restated, altered, exchanged etc. The initial sources are often referred to as the original documents, executed documents or final (static) documents. Revised documents are sometimes called amended, waived or restated documents. They tend to be dynamic. While some of the data can be considered structured, most of the agreement contract matters are unstructured.

All of these risks are considered in relation to local and global market issues. Weighing the static and dynamic features of the transaction risks individually and collectively against a dynamic basket of technical markets benefit from intuition and using the assessment of material drivers of risk/reward.

Extracting data points from the underlying transaction and financial documents and other sources can be helpful. Extracting the data element in a more specialized process that imbeds contextual application to the individual risks at hand and how they stack together is particularly desirable. When this contextual extraction is applied to millions of data items such as documents, filings, interviews, revised secured-asset tapes etc., that are not well linked, the analytical leverage that is afforded to a person can be material. The value of this information and benchmarking leverage results in a more informed analysis and investment decision. Smart well-researched analysis can result in trillions of dollars of incremental value.

Risk is often used when assessing downside exposures. Although this is often true, a risk element can sometimes be a positive attribute. For instance, a borrower event related to a risk element can occur which can give a lender an opportunity to increase its lending rate. A risky item can be a profitable item from the lender's perspective. This agreement to increase the rate in the event that a risk even occurs is often scribed in contractual documents.

The finance industry currently lacks helpful standards on how to document and in turn analyze business transactions and financing data elements including in the related documents.

Scale and a lack of standardization is a significant constraint some parties can have thousands of investments in these bespoke transactions. Having a way to quickly, consistently and insightfully weigh risks and enter those risk assessments into other predictive and maintenance models is a need to the lending and investment communities.

SUMMARY

This present invention improves upon existing computer systems that review documents in that a computer system according to the present invention, in various embodiments, empowers a person to better analyze risk, measure risk, report important risk, mitigate risk and optimize the investment opportunities associated with a risky item. Still further, as the computer system analyzes more transaction/financing related matters, the computer system becomes more sophisticated and helpful to the user, thereby enhancing its economic value with continued usage.

While the contextual extraction and analysis of information is a foundational aspect of this invention, it is the sequencing of the extraction protocols that can result in an intuitive risk assessment. The investigative nodes are connected in a neural-like network that is set up to "connect the dots" as it relates to analyzing the material risk attributes of a transaction/financing deal. Further, as each node of sequenced and specialized inquiries is improved (as the specialist uses the system) the intuition features of this invention improve.

In one general aspect, the present invention consists of two primary attributes; (1) a computerized database of specialized detection, contextual extraction, scoring, benchmarking intuition weighing and specialized reporting tool and (2) specialized technology to perform a complex review of key risk drivers as well as other elements using those tools more precisely, more consistently, faster and in a lower cost fashion. As more and more risk analysis reviews are performed using the combined attributes of this invention, the computer systems of the present invention can store the discovered evidence (anonymized or not) and use it to enhance the sophistication and speed of a risk assessment for future users. Each risk analysis module is further weighed to create a neural analysis that creates "risk intuition".

Risks can come in many forms but they rarely stand alone. Layered risk is a term used to identify the materiality and interdependence of one transactional/financing feature against another.

The users of this risk-analyzing output can be, but are not limited to, transaction parties and non-parties, such as investors, government agencies, lawyers risk managers, compliance managers and researchers, to name a few. As the inventive tools are used more frequently, the system can create a growing form of synthetic institutional knowledge related to minimizing/optimizing the risks associated with the portfolio of transactions reviewed to date. The computerized institutional knowledge related to assessing risk and making the output deliverable easy for an investor to use is made available using numerous digital delivery tools.

The inventive tool provides an investigating analyst with sophisticated investigative expertise and risk weighting that is often found with seasoned veterans. This invention is a way to reduce key man risks and lower labor costs in the lending/investment fields.

Priming the pump. In early uses of the computer system, an individual person will use each investigative node of the investigation framework, described further below, and coincidently train the computer to generate more useful results in future applications. This initial task will "train" the invention to target its activities to matters related to the specific item that is being analyzed. Effectively, this priming will state tell the system "Where to find it". Over time, this upfront work will be enhanced with additional training that is implicitly found when an analyst uses the invention and sites "Where I found it".

The computer system can be pre loaded with controls. For example, a transactional matter that is being analyzed can be compared against a control item and thus establish a benchmark weighting relative to that control. This comparison against the control could be named a "Score," but there are numerous other control comparison types including material/immaterial, pass/fail, good/bad, etc. that could be used.

The contextual extraction of risk elements from many data sources such as contract documents can be exportable to and used by external software with related databases. The computer system's automation of analysis and risk weightings coupled with or exported to other databases can exponentially expand the sophistication of risk minimization/optimization and in turn economic value.

Information related to the corporate and financial industry tends to be found in eight primary areas. This includes documents, ledgers, audio content, visual content, filings, searchable databases, personal interviews, research and other related media. In various embodiments, the computer system of the present invention views references and notes all of them. The term "documents" is used herein to denote all of these types of information sources unless otherwise noted.

Access to the various data sources can be restricted for various transactions. For instance, a consumer may not wish to have the general public know about their purchasing activities. The data elements related to a transaction are usually viewable by two groups of parties: insider parties or the general public. These viewing exclusions/restrictions or viewing authorizations also could restrict the population of information sources (documents) that can be or cannot be analyzed and who can read the risk assessment analysis. For confidentiality management purposes, the "detective" aspect of the computer system can be constrained based on the access privilege of the specialized analyst and the distribution protocols of the allowable data, the specialized investigator and the report reviewer. An analysis based on more detailed private information will often generate a more insightful analysis. An analysis based on public information only which tends to be more of a disclosure document that has been biased by the writer of that summary public document. This public only restriction can reduce the depth of this invention's analysis sophistication and introduces undesirable bias in the invention's output due to bias of the input. Controlling who can read certain information sources and who can read the analysis output is an important part of the computer system. Limiting or constraining the information sources or viewers may be a confidentiality requirement.

Further complicating the risk analysis is that the transaction/financing related documents are often amended and restated, and contract provisions are often waived over the course of the agreement's term. The computer system of the present invention can be applied to reviewing the documents upon the closing of the transaction (upfront static information) or at a user-specified date after the transaction occurs or starts. That specified date can be during the scheduled transaction's life or even after the transaction has expired but follow-on risks remain or arise. The later analysis can incorporate new structured and unstructured data related to the transactional matter that collectively makes the analysis more timely and valuable. This evolving dynamic data set could impact the revised weighing of the risk benchmarking and intron scoring.

In various embodiments, the privileged access output from the computer system can comprise: (a) a computer generated report that identifies and benchmarks/scores notable, positive and negative risk information; and (b) a data set comprised of identified evidence that supports the scoring and benchmarking practices. While the inventive computer system does not, and is not intended to, predict the future, instead being focused more on the analysis of downside risk exposures if a downside event occurs. The computer system may have internal predictive abilities if programmed, however, such as most probable, less probable, least probable lending/investment risk elements. The system output coupled with data items and other systems broadly usable in the finance industry can yield advanced predictive modeling. Further, while the individual risk analysis components of the computer system create a cumulative benefit, they can be used individually in various embodiments. The predictive confidence of an investor's purchase/sale of a financial instrument related to a transactional matter should be materially higher based on these sophisticated analysis processes.

The sophistication of an analysis paths within this invention can benefit from extensive research on historical drivers of risk. This includes research on legal complaints, judicial decisions, trader experiences, changing regulations and global economic items that can impact an investment's forecasted risk/return profile, to name a few.

In one general aspect, therefore, the present invention is directed to computer-implemented systems and methods to enhance a user's sophistication (e.g., a specialized investigator) as she/he reviews complex information sources (documents) and other data items relative to a particular issue(s), such as operational, reputational, market, transaction structuring, legal or financial risk, using specialized detective tools provided by a user interface of the computer system. The information sources such as documents can be related to transaction/financing related documents such as agreements and other documents that are used in a financial arrangement, such as but not limited to a securitization transaction, although the embodiments of the present invention could be used for other types of complex transaction documents. The specialized investigative inquiries are stored in a database and are particularly tailored a priori by a subject-matter content designer for the type of documents being reviewed for risk and opportunity. Further, the investigative scripts are organized into to a path of risk-related subjects or topics, and within each path of subjects/topics the investigative scripts are organized into a specialized inquiry or flow chart. As such, when the specialized investigator selects one of the pre-populated specialized-response options for a specialized inquiry or adds a custom response, the next specialized inquiry will depend on the prior specialized-response option, such that the specialized-response options lead the specialized investigator down a particular branch of the investigative specialized inquiry scripts. When the specialized investigator completes the sequence of individual inquiries for the evolving investigative branch, the computer system computes a benchmarking score, e.g., an assigned risk score, for the particular subject of inquiry, where the score is based on (e.g., assigned a priori by the subject-matter content designer) that particular branch of the specialized inquiry. That score is often based on the system designer's prior assessment of stacked or cumulative risk items plus user based additions. The specialized investigator(s) can provide responsive answers for each investigative script for each subject or allow the specialized analysts to provide their own. The assigned risk scores for each subject that are provided at the end of the survey can then be combined (e.g., averaged) to form a composite assigned risk score for the transaction itself.

Insightful risk assessment is not always a single path dependent analysis approach. It is the analysis of the variously risk assessments connected in a neural fashion that can collectively generate an exceptional analysis output. This invention provide the topic level scoring so that the collection of scores on many analysis items can be assessed in a cumulative fashion.

The specialized investigators' responses to the inquiries also has the ability to include guidance from the system designer about where in the data in response to the specialized-response option is often found (e.g., a location identifier). Further, before proceeding to the next inquiry, the analyst can be given input ability to identify where she/he in fact found informed information as well as record why the material or description at the location identifier found supports the specialized-response. Additionally, the specialized analyst can record separate information sources that have conflicting, collaring, diluting, limiting or accelerating information. The specialized investigators' specialized-response and explanations for each specialized inquiry are stored in a database and indexed to the data source such as a document that was reviewed. The data found within a data item such as a document can also include the type of transaction (e.g., a securitization for MBS), the party (is) involved (e.g., the borrower servicer, issuer, lender, etc.), and the date, for example. All this information is stored such that when a specialized investigator reviews another document using the system in the future, the specialized-response option database can be searched for similar transaction/financing related documents, with similar parties, etc., to determine the most likely location of where the supporting or contradictory evidence for the specialized-response option for investigative scripts can be found. In that way, when a specialized investigator is providing responsive information on a specialized inquiry for a particular transaction/financing related document, the user interface can display to the specialized investigator the mostly likely place(s) where the specialized-response option may be found, based on the upfront set up of the inquiry by the system content designer or from prior responses for the same investigative script and the data access restrictions. The computer system of the present invention can provide the content designer with ability to pre load a recommended place to find supporting and possibly contradictory data in the documents and other data items. The invention may further provide the specialized investigators with features to add location options to that list of probable places to find responsive affirmative or conflicting data. Collectively, the invention allows future users to benefit from the initial guidance and continuously updated guidance on where to find the evidence. This makes the future users faster in finding supporting evidence and more insightful.

An individual inquiry can programmatically incorporate a scored index or list of prospective evidence citations to aid the specialized investigator. Further, the index/list of prospective evidence citations can accumulate insight as more analysis is performed on more transactions and the specialized investigator confirms where she/he found the responsive evidence. Searching for "not found" items can be equally valuable as confirmatory evidence, excluded evidence or conflicting evidence found. Common business points that are not documented can introduce risk.

Still further, there may be instances where a specialized inquiry or specialized-response option needs to be added. The inventive system includes communication tools that allows the specialized investigator to provide feedback and make recommendations to her/his supervisor. The system's content designer can make "on the fly" or future enhancements to the specialized inquiries and/or specialized-response options. Over the passage of time, the need for enhancements is likely to be reduced as more transactions are analyzed. The data inclusions and report reading exclusions mentioned previously will impact this as well.

The computer system may employ OCR tools to reduce human interface. To be the most effective, the OCR benefits from a list of guidance on where to find affirmative or conflicting information. This inventions initial recommendations on where to find responsive information plus the added location information provided by the specialist provides highly sophisticated guidance for the OCR tool to find the most beneficial supporting evidence. Further, the OCR tool may become more effective as it is used more often.

The population of data items that can be analyzed on a financial matter is unique to the analysis project at hand. The structured and unstructured data sources considered by the inventive system can include, in various embodiments, (1) draft and executed documents, (2) voice content, (3) video content, (4) electronic communications such as e mail, text, chat room and other social media, (5) regulatory or other filings, (6) complaints, (7) activity testing results, (8) alpha and numeric data tape, (9) surveys, (10) transcripts, (11), research reports, (12.) distributed ledger information and other digital or physical media. Those items can be found using a storage tool so that the user can systematically find, mark and/or store the data. In that connection, embodiments of the present invention can be used for many different types of transactions, even though each is unique, because the subject-matter content designer coupled with or without the analyst's supervisor can tailor the investigative scripts to the relevant issues involved in the transaction. For example, the system can be used to analyze financing documents regardless of whether they are structured cash or derivatives, whole loans or participating loans, secured or unsecured, guaranteed or unguaranteed, etc. If a particular transaction/financing related document is more unique than others previously reviewed, the investigative scripts and risk analysis framework for its most similar previously reviewed transaction can be used as a starting place. In that connection, agreements that can be reviewed with such a system include, but are not limited to, loan agreements, transacting loan agreements, financing agreements related to portfolios of loans and other debt products, such as cash instruments, derivative instruments and insurance instruments. This library of data sources such as documents can also be linked to OCR resources and specialized data sorting tools to improve the speed and depth of analysis.

Given the analytical considerations to various and inconsistent data types and different source locations of data of affirmative and conflicting information as well as the fact that the extracted and analyzed data is stored in a structured fashion, the computer system of the present invention can implicitly create large data sets of structured data that can be used elsewhere. Seeing that an analysis can be performed numerous times on a matter over the course of that matter's useful period, this recurring analysis and the storage of the applicable responses can create a substantial database of standardization transactional/financial data features on one transaction. The placement of the raw or underlying information into the structured database effectively creates data standards that can be used elsewhere.

The benchmarking feature of the invention grows in sophistication as more transactions/financing matters are analyzed and the results are saved and compared. Peer relative value analysis is an output from the invention.

The computer system can employ dictionaries for one or more languages, such as English, to search for words in those languages.

The computer system of the present invention can be used as an instructional tool for new persons entering the industry and wanting to learn key items in significant detail. It can also be used by lower level analysts in the instance that more seasoned personnel leave the firm. Due to its accumulated knowledge, the computer system of the present invention can create conceptual digital institutional memory and reduces key man risk.

The sequence of investigation nodes can be structures with macro analysis issues upfront and more detailed analysis issues later. This investigative sequencing can reduce time allocations. If the early analysis results in no or not applicable, there may be limited value in continuing on to a more detailed analysis. Descriptive items tend to be upfront and prescriptive items follow. The sequencing can vastly improve reliability and effectiveness.

The user of this tool can be a loan officer that seeks to create an informed investment memo for the investment committee, a collections department staffer that seeks to collect all monies on complex matters, risk supervisory managers, compliance supervisory managers, regulatory managers, researchers etc.

As the system is used for different transactions and accumulates transactional knowledge (data points), it can become more insightful on one or more investigative nodes such that it can answer one or more inquiries collectively or automatically. This automation can speed up the time to conclude an analysis which results in lower cost and more timely output.

The assigned risk scores can be used to identity mitigating actions to reduce or capitalize on the frequency of loss and loss severity. For example, if a particular transaction/financing related document has a score that indicates a high risk, the individual subject matter assigned risk scores can be reviewed to see which subject scores are lower than expected. Then the specialized-response options to the investigative scripts within the identified high-risk categories can be examined to identify the risks at a more granular level and what mitigating actions could be taken to reduce the risks that have been identified.

In addition to simplifying and enhancing the sophistication of the review process for the specialized investigators, the focused specialized inquiries and associated specialized inquiry paths tend to lead to a better overall and more accurate assessment of the complex risk elements and their related documents and other information. Further, by storing and analyzing the specialized investigators' specialized-response options and comments, system designers can adapt the specialized inquiries and scoring (specialized inquiry) paths over time to improve the overall risk assessments and benchmarking. The sophistication of analysis and benchmarking can be further enhanced by the content designers based on external research. These and other benefits of the present invention will be apparent from the description that follows.

In instances where a transactional and financing matter has a new and different structures, the computer system's accumulated knowledge may be less insightful on this structure, but the content designer can update the computer system as needed. This creates a second and more insightful version that later specialists can use when that structure arises again in the future. The content to inform the designer to consider an update can come from two locations; content found independently by the content designer or "notes to designer" links that the specialist can provide to the designer if they see fit. Collectively, this computerized feedback loop makes the intellectual content within the system more insightful over time.

The system, in various embodiments, incorporates multiple custom UIs such as: a system's software architect's UI, content designer's UI, data manager's UI, base detective content library UI, client-specific detective content library UI, OCR management tool UI, Risk/reward intuition weighing UI, supervisor assignment UI, specialized analyst UI, Feedback loop UI, Client/subscriber UI, findings export UI, and a report generator UI to name a few. Each custom UI can have specialized security access, storage usage and supervisory tools.

The system can incorporate and be implemented with software modules that are based on and/or written in many computer languages. The system can use different languages for specialized tasks. The system can create a protocol to capitalize on and coordinate their individual strengths.

Identifying risk is not all about downside exposures. A borrower's risk can be a lenders justification to charge more interest. This system identifies those risks and facilitates lending and investment optimization.

Finance is highly complex but tends to follow patterns. Like a reservoir dam, all transactions have "leaks". Those leaks can become catastrophic if they are concentrated in a small area or influenced suddenly by outside forces. Having the ability to detect outlier risks and assemble them into usable forms is invaluable in a multi trillion-dollar market. The system's computerized process of identifying, benchmarking and continuously improving risk analysis effectively creates digitized institutional knowledge which in turn can be exported to other computer systems to initiate remedies to those risks. The way the system exports those items is a meaningful part of this computer system's value.

FIGURES

Various embodiments of the present invention are described herein by way of example in connection with the following figures, wherein:

FIG. 5 illustrates a database structure for storing responses to investigative scripts for transaction/financing related documents according to various embodiments of the present invention;

FIG. 9 illustrates an example chapter report according to various embodiments of the present invention;

FIGS. 11-19 are additional screen shots displayable by the system according to various embodiments of the present invention.

DESCRIPTION

Figure 1:
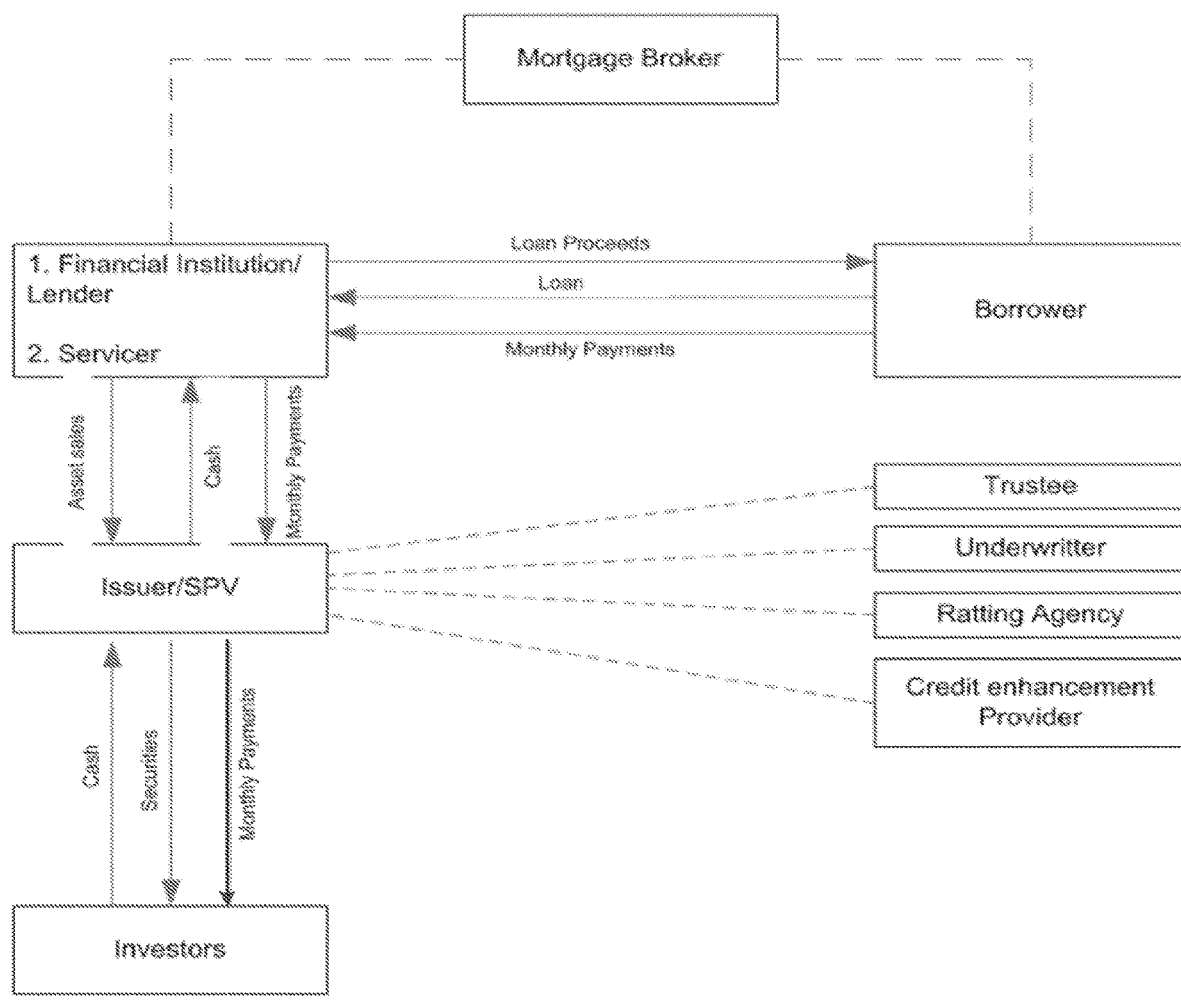
FIG. 1 is a diagram of a typical securitization process flow.

In one general aspect, the present invention is directed to computer systems and related computer-implemented methods for analysis-based scoring of business risks and, in particular, providing graphical user interfaces that make the analysis significantly more efficient than existing analysis techniques. For example, the systems and methods can be used for benchmarking and in turn scoring the risks present in transactions and financing transactions for a securitization, such as loan and/or bond agreements. The computer system provides a user interface to a user with investigative risk-oriented scripts tailored to the type of subject and document the user is reviewing, such as a securitization document or other type of document. As such, one user (e.g., an analyst) of the system may be a specialized investigator tasked with reviewing information sources such as documents and other data elements. The investigative scripts are designed to determine, validate or verify how the document addresses, or not, various risk contingencies (such as operating, legal, market and/or royalty risk) or other issues described within by the document. Preferably, alongside the user interface, an analyst reviews the data items such as the document being scored to compare it against specialized-response options for the investigative scripts. The queries and corresponding response-options for each query can be prepared by a subject matter expert or "designer," and the system can store electronically the queries and response-options in a database of the back-end computer system, as described herein. The categories of investigative analysis can be broken down into sub categories, subjects or "chapters." There can be, for example, dozens of categories/subjects, such as forty (40) or so for one transaction's analysis. A collection of one or more investigative scripts related to a category (or content chapter) leads to a summarized score for the collection of investigative scripts. The score may indicate, for example, how well the documents resolve or addresses the various risk contingencies covered by the document or the corresponding transaction. In various embodiments, the higher the score the better (e.g., less risky) the information features, although the scoring system could be set up so that lower scores are better. As shown below, the investigative scripts can be in the form of a flow chart or tree, so that a particular response to one initial investigative script leads to different follow-up specialized inquiries than a different response to the initial investigative script. That way, the analyst can efficiently complete the series of queries by not wasting time on irrelevant queries/subject matter. Once the analyst completes the analysis, a composite score for the available information can be computed based on the scores for the individual collections of specialized inquiries across the various chapters. For example, in an embodiment where the systems/methods are used to score the risk imbedded in a securitization document, the score can indicate the risk embedded in the transaction's features. The specialized inquiries and associated scores can be determined or set by a content designer such as a subject matter expert in the field (e.g., a "designer") as mentioned above.

The scoring that can be found at the end of an investigative analysis is usually a numeric score. In other versions of this invention, there can be other benchmarking disclosures such as pass/fail, material vs. non-material, helpful vs. non-helpful, etc. For example, a numeric score can be converted to such classifications based on whether the numeric score is within the range for a particular classification.

Figure 2:
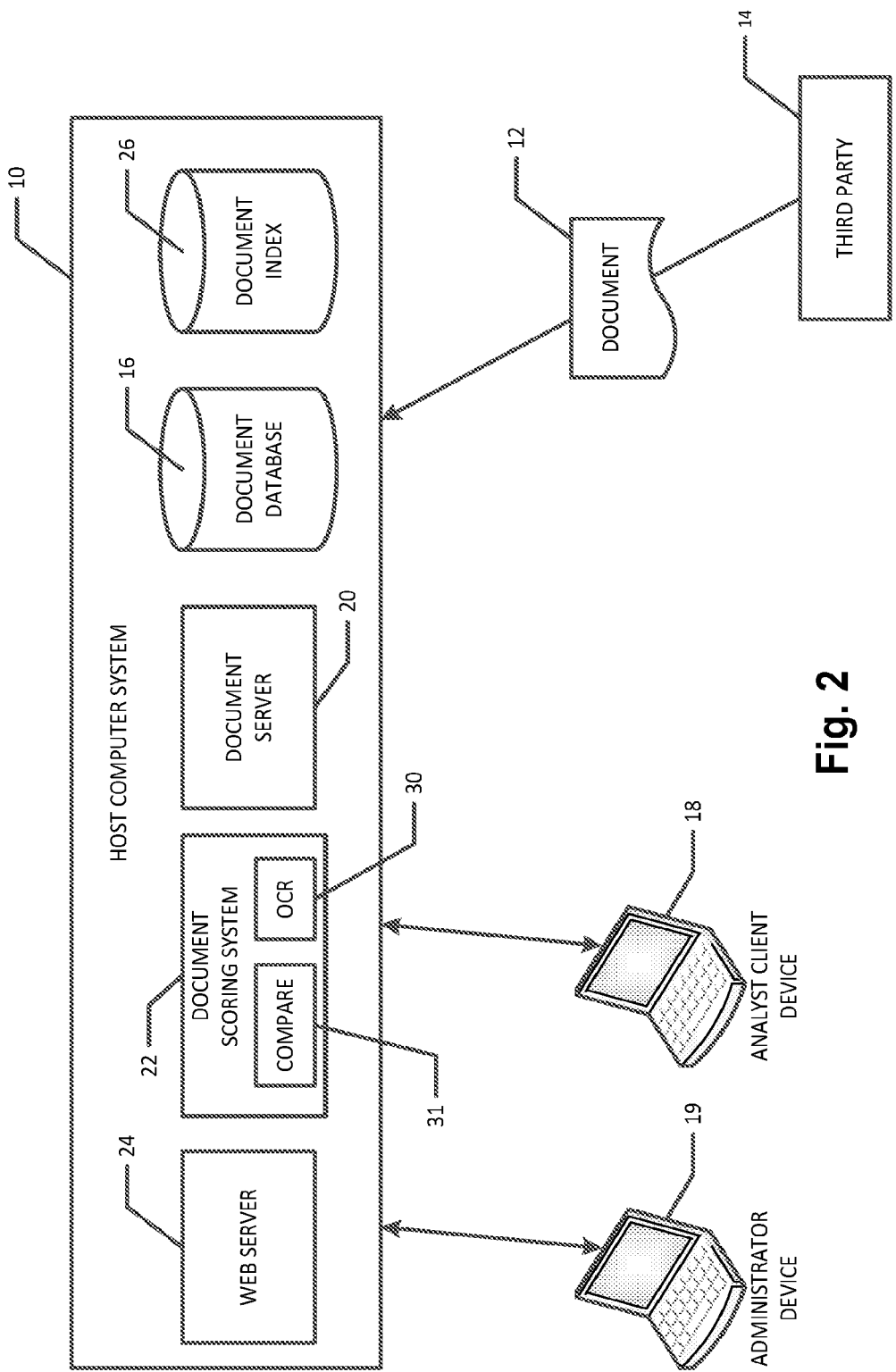
FIG. 2 is a block diagram of a computer system according to various embodiments of the present invention.

FIG. 2 is a diagram of a computer system according to various embodiments of the present invention. The computer system comprises a back-end host computer system 10 that receives data such as a transaction/financing related document 12 to be analyzed from a third party 14. For the purposes of the description to follow, the buy/sell transaction/financing related documents 12 are assumed to be a securitization document, and in particular an ABS, and the investigative scripts are designed to identify how the securitization document treats the various risk contingencies associated with that particular ABS. It should be noted, as explained further below, that the present invention is not limited to being used with securitization documents, and it could be used with other types of buy/sell transaction/financing related documents. Also, the transaction/financing related document 12 is preferably in a human-readable, text-based format, such as pdf, XML or a word processing format (e.g., Word). If the document is not word-searchable at the time of uploaded, it can be made word-searchable by the optical character recognition tool described below.

The host computer system 10 may be implemented with one or a network of co-located or distributed servers or other types of computer devices, such as mainframes, for example. The third party 14 may be, or may be associated with, the issuer, the service provider and/or the lender for the securitization, for example. The third party 14 may transfer the data item such as a document 12 to the host system 10 in an electronic version, such as pdf, via email, a file transfer system, or by any other suitable means for transferring and storing copies of electronic documents. The host system 10 stores the document in a document database 16. Also, the document 12 may be stored in physical or digital form in a data room (e.g., a virtual data room in the case of a digital document) or on a distributed ledger.

When an analyst wishes, or is tasked with, reviewing and benchmarking various risk elements found in one or more transaction/financing related data elements such as documents 12, a document server 20 of the host system 10 can display the document 12 on that party's device 18, such as in a browser on that party's device 18, in response to a request from the party's device 18 for the document 12. That party's device 18 and the host computer system 10 may be in communication via a data network, such as the Internet, a LAN, a WAN, etc.

In various embodiments, the analysis script related to analyzing the basket of allowable data sources, including documents, can be provided by a web- or HTML-based application provided by the invention's scoring system 22 and a web server 24. The risk benchmarking system 22 may store each relevant specialized inquiry, including the predetermined possible responses for each inquiry, as well as the combined specialized inquiry paths (as described further below) and compute the final benchmark identifier such as a numeric score for the combined risk-assessment items, along with individual subject scores for the special matter for each applicable subject, based on the analyst's responses to the investigative scripts. The analyst may access a pre existing library of investigative scripts; use their own library of investigative scripts via a browser on the user's computer device 18; or a combination of such. A web server 24 of the host computer system 10 may serve web pages to the analyst's computer device 18 that contains the user interface for the investigative scripts, and the web pages are rendered by the browser of the user computer device 18. Also, multiple different analysts can assess the system to score different subjects/categories of the same transaction/financing related document simultaneously. For example, one user can use the system to score the transaction/financing related document for the 1st subject/chapter, a second user can simultaneously use the system to score the same transaction/financing related document for the 2nd subject/chapter, and so on. To that end, the host computer system 10 (e.g., the web server 24) may support multiple simultaneous user sessions applicable to one matter or many different transactional/financial matters at the same time.

The host computer system 10 may also be programmed to exercise version control so that two different analyst cannot edit the inquiries and specialized-response options that the investigative scripts for the same subject/chapter at the same time. Additionally, there could be more than one analysis content library.

Also as shown in FIG. 2, the system may further include devices/computers 19 for administrators, subject matter subject-matter content designers, application engineers, a supervisor(s) for the analysts, etc. that are in communication with the host system 10 via a network connection. From the administrative computers 19, an administrator, subject-matter content designer, application engineer, supervisor, etc. can make changes, updates, modifications, etc., to the system as described further herein. For example, a designer can revise the queries and/or responses; an application engineer can modify the scoring algorithms; a supervisor can edits a final report and/or assign tasks to analysts, etc.

Figure 3:
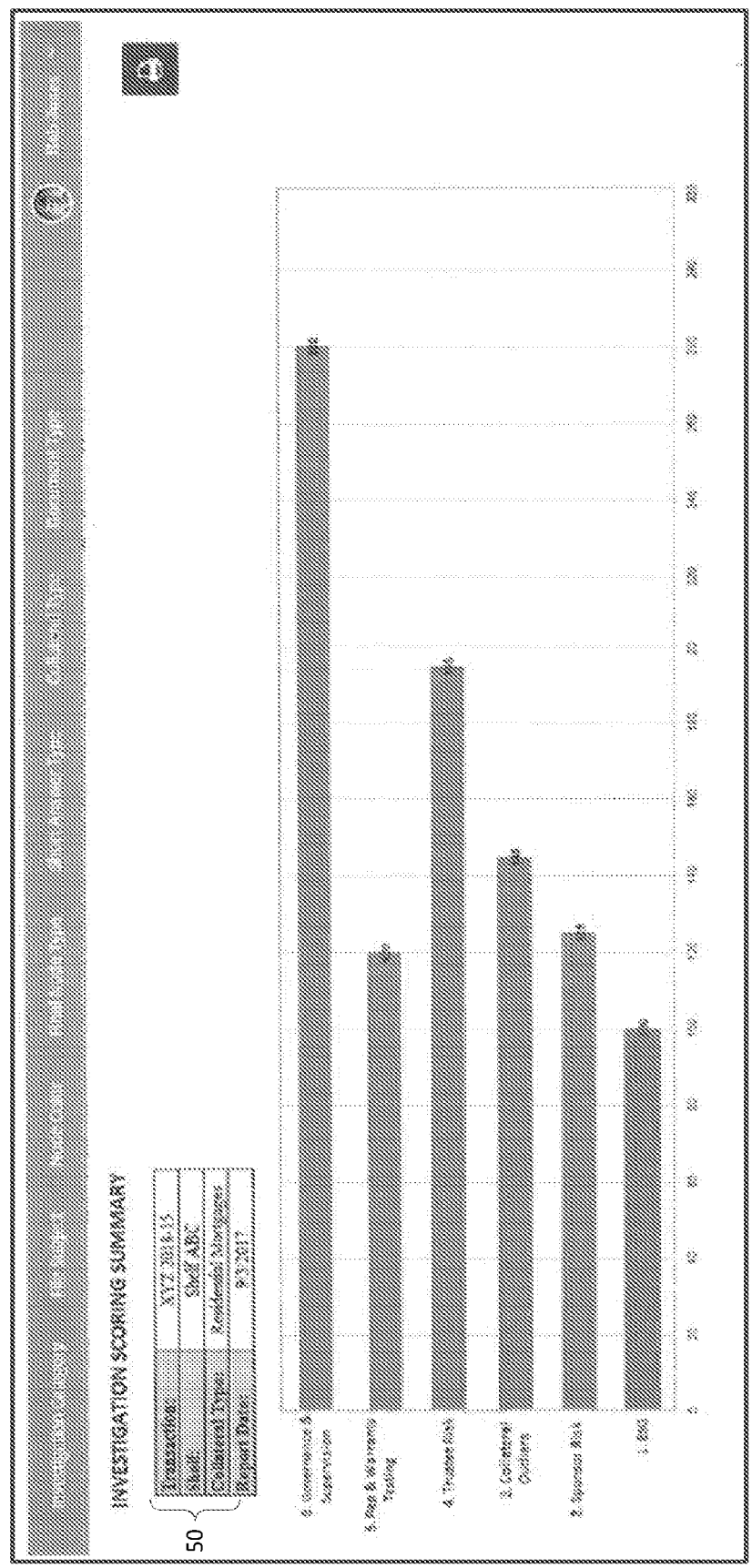
FIGS. 3, 4, 6 and 7 show screen shots that are displayable to an specialized investigator reviewing a transaction/financing related document according to various embodiments of the present invention.

FIGS. 3, 4, 6 and 7 are screen shots showing examples of the user interface provided by the scoring system. The screens shots may be displayed as web or html pages, for example, served by the web server 24 to the user device 18. FIG. 3 shows a scoring summary page. Referring to the key in the upper left in this representative example, the identifier for the financing document being reviewed in this example is given by the anonymized or non-anonymized "Transaction" number. The "Shelf" field may indicate a party related to the transaction that provided or authored the document. In the case of securitization documents, that party often is a financial institution such as a lender. The "Collateral Type" field is particular for securitizations and shows the collateral in the securitization, in this example, residential mortgages. The report date field shows the last date that the report was edited.

The user can print out certain screen shots from the system and use those print outs to communicate with her/his associates if they prefer printed versions. In various embodiments, the computer system may employ software code written in Python to convert HTML, webpages to PDF format for printing. The Python can convert the HTML content for a web page to PDF using, for example, a SelectPdf HTML To PDF REST API through a POST request, with the parameters being JSON-encoded. The resulting content can be saved into a file on a disk of the computer system for printing.

As mentioned above, the investigative scripts could be grouped into primary and secondary analysis categories or "chapters". The example illustrated in FIG. 3 shows six possible chapters relevant to a residential mortgage securitization—ESG (environmental, social and governance) risk, sponsor risk, collateral outliers, trustee risk, representation and warranty testing, governance and supervision. In practice, there could be dozens of different analysis categories or chapters. The example illustrated in FIG. 3 shows that there can be a numerical score for the chosen inquiry path associated with each chapter, and the bar graph shown in FIG. 3 illustrates the score for each chapter. The scores are derived from the responses to the investigative scripts in each chapter. How each response affects the final score can be set by the designer. Each of the bars in the bar graph may include a hyperlink, such that when the analyst clicks on a bar for a particular subject or "chapter," the analyst's browser opens the investigative script page for that subject/chapter so that the analyst can commence the investigative research.

The scores for nodes and chapters are assigned upfront by the content designer, stored in a database of the back-end computer system, and then refreshed manually and or automatically as evidence is found to justify a change in the score. Given the focus on risk, the scores tend to focus on downside risk exposures which in turn tends to bias to a lower score features. For instance, a party who provides their service to a fiduciary standard of care could get a score of 95 (out of 100) yet an operator that is a poorly capitalized could get a score of 40 (out of 100) even though they are both providing a somewhat similar service.

Figure 4:
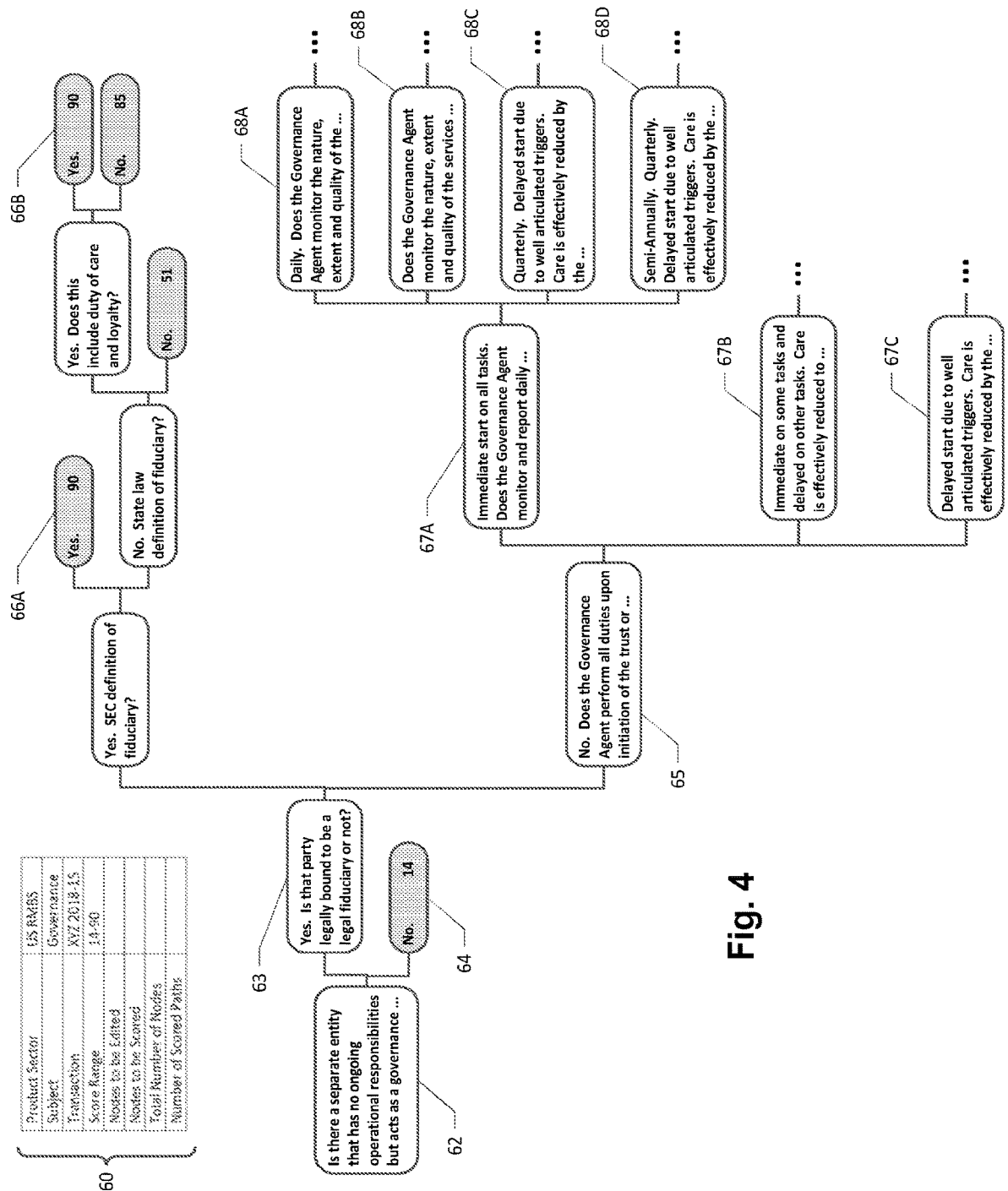

An example investigative script page is shown in FIG. 4. In the illustrated example, the investigative script page has a key 60 in the upper left that shows the subject of the investigation or chapter (in this case, governance) for the particular product type (in this case, US RMBS or U.S. residential mortgage backed securities). The key 60 may also show the range of possible final score options for the subject matter of the particular category/chapter for the document (in this case, a final subject score range of 14 to 90 wherein, in this example, a higher score is better (less risk)). As shown in the example of FIG. 4, the investigative scripts are shown in a specialized inquiry view with numerous nodes. The key 60 may show the total number of nodes in the specialized inquiry for the chapter. The key may also show the total number of nodes in the specialized inquiry for this category/chapter to be reviewed, and the total number of nodes that result in scores. The nodes to be edited are shown in white and the end a node is shaded grey. For each investigative and scoring path the analyst's UI provides the investigative scripts that the user (referred to below sometimes as a "specialized investigator" or "analyst") considers as she/he selects a specialized-response option or provides a free form answer. In the illustrated example, the user (e.g., specialized investigator) works from left (the beginning) in the field of possible nodes to the right (the end). In the instance that there is a reason to record where confirmatory or conflicting information related to an inquiry is found, the system, including the user interface, provides an infrastructure to do such. The user clicks on the left-most node 62, whereupon the investigative script is displayed in full for the user and the user is provided a space or field in which to input, in text, for example, the source or location where the responsive information was found. The first specialized inquiry in the illustrated example is whether there is a separate entity that has no ongoing operational responsibilities but acts as a specialized agent. If the user determines the specialized-response option is yes, the user enters a location identifier for where evidence supporting that determination was found (supporting evidence). The location identifier for the supporting evidence could be a verbal discussion, research paper, transaction document, a section within in a document or sub-section title, a page number(s), and/or a section number(s) (e.g., Section V.A.3.b.ii(b)(2), etc.). The interface may further allow the user to provide a short description of why the supporting evidence at the location identifier confirms or conflicts with the chosen specialized-response. The description and supporting evidence citations may help with analysis quality control and/or help the search functionality for future analysis. The scoring system 22 may store in the query/response database the specialized-response option entered by the analyst, the location identifier for the supporting evidence, and the description in a data file that associates the response to each specialized inquiry/node identifier for the transaction/financing related document for the shelf (e.g., bank). That way, as explained further below, the responses related to the same specialized inquiry for different, but similar, transactions for the same and/or different banks could be queried, compared and analyzed for this and future transaction/financing reviews.

An edit node, such as node 62, includes a number of connected nodes to the right, with the number of connected nodes indicating the number of possible response options to the specialized inquiries. Some specialized inquiries/nodes, such as node 62, can have two possible responses, such as yes/no responses. Other nodes can be set up to have multiple possible specialized-response options, such as nodes 65 and 67A, for example.

Also, in various embodiments, the nodes may allow the user to input a confidence score related to the evidence found for the specialized-response option. The node may, for example, allow the user to input a numeric confidence score in a range, such as one to five, one to ten, or one to one hundred, for example, with the higher the number indicating a higher confidence on the part of the user that the user's specialized-response option for the analysis node specialized inquiry is correct. Low confidence scores can be used to prompt a second review of the data item such as a document by a more experienced or knowledgeable investigative analyst and generate a specialized notation in the output report. The confidence score can act as a filter when giving feedback to the content designer who may use that information to update the system for future applications. A low confidence score may suggest a modernization to the system code may not be useful.

As shown in the example of FIG. 3, there are two nodes leaving node 62—nodes 63 and 64. Node 63 corresponds to an affirmative specialized-response option at node 62 and node 64 corresponds to a negative specialized-response option at node 62. Thus, if the specialized-response option to the first specialized inquiry at node 62 is yes, the user then proceeds rightward to the next node 63 and repeats the process for the investigative script at node 63. Preferably, the scoring system software 20 does not allow the user to move to the next node until a specialized-response option is provided to the preceding node. That ensures an orderly, linear and complete progression through a particular investigative sequence. If the specialized-response option to the investigative script at node 62 is no, the user proceeds to "end" or "terminating" node 64, which in this example terminates the specialized inquiry for this category/chapter with the score indicated by the end node 64 (in this case, a score of 14). Sometimes a yes specialized-response option can terminate the specialized inquiry, such as shown at end nodes 66A-B. Such terminating yes nodes can be used to prompt a score for the category/chapter. Preferably, as shown in the example of FIG. 4, each path through the specialized inquiry leads to a terminating node and as associated score. The complete specialized inquiry is not shown in FIG. 4 as indicated by the ellipses for nodes 67B-C and 68A-D.

Figure 11:
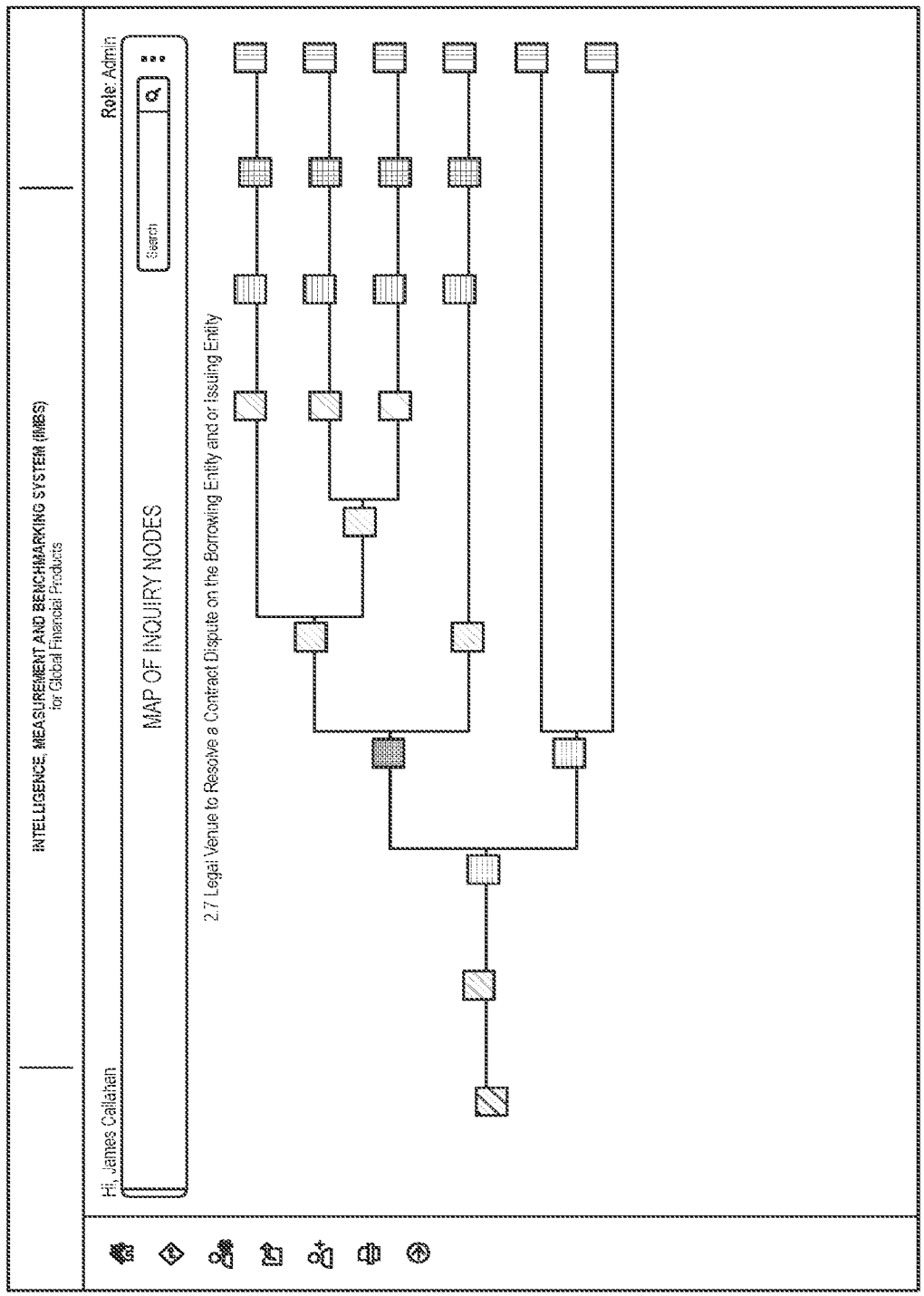

FIG. 11 is another example screen shot showing the node tree according to various embodiments. A subject matter expert designing the queries for a chapter can use the color-coded node scheme of FIG. 11, where, for example, similar types of nodes have the same color and/or where the levels (or columns) of the tree are color coded. That is, in the later variation, nodes at the same level (or column) can be the same color.

As mentioned above, in the investigative interface tool, the specialized investigator inputs the place in the information source content (e.g., location identifier) where the specialized-response option to the investigative script is found. The scoring system 22 (e.g., a database thereof) can store the individual responses in the document index database 26 (see FIG. 2). Further, the document index database may store then export a copy of the responses in a spreadsheet or table form, for example, that shows the location for the responses to each specialized inquiry. The metadata for the specialized inquiries/responses can include the transaction/financing related document itself, the category for the specialized inquiry, the specialized inquiry identifier, the product sector or collateral type (e.g., residential mortgages), and the shelf (e.g., the bank that created the document), such as shown in the example of FIG. 5. Thus, the spreadsheet/table could be sorted by Doc ID, product, bank, chapter, question ID, etc. FIG. 5 shows an abridged table with three prior RMBS deals by ABC bank (Doc IDs 0001, 0003 and 0004) and one prior RMBS deal by DEF bank (Doc ID 0002). The table further shows for each specialized inquiry (specialized inquiry ID) in each category/chapter, where the specialized-response option was found (response column). In the illustrated example, the location is shown as a page number of the document. In other embodiments, the location identifier for the response could be a section/sub-section title or number in addition to or in lieu of the page number, or any other suitable location identifier for the document. This information can be invaluable to other systems which load this computer system's data into their computer system.

Figure 6:
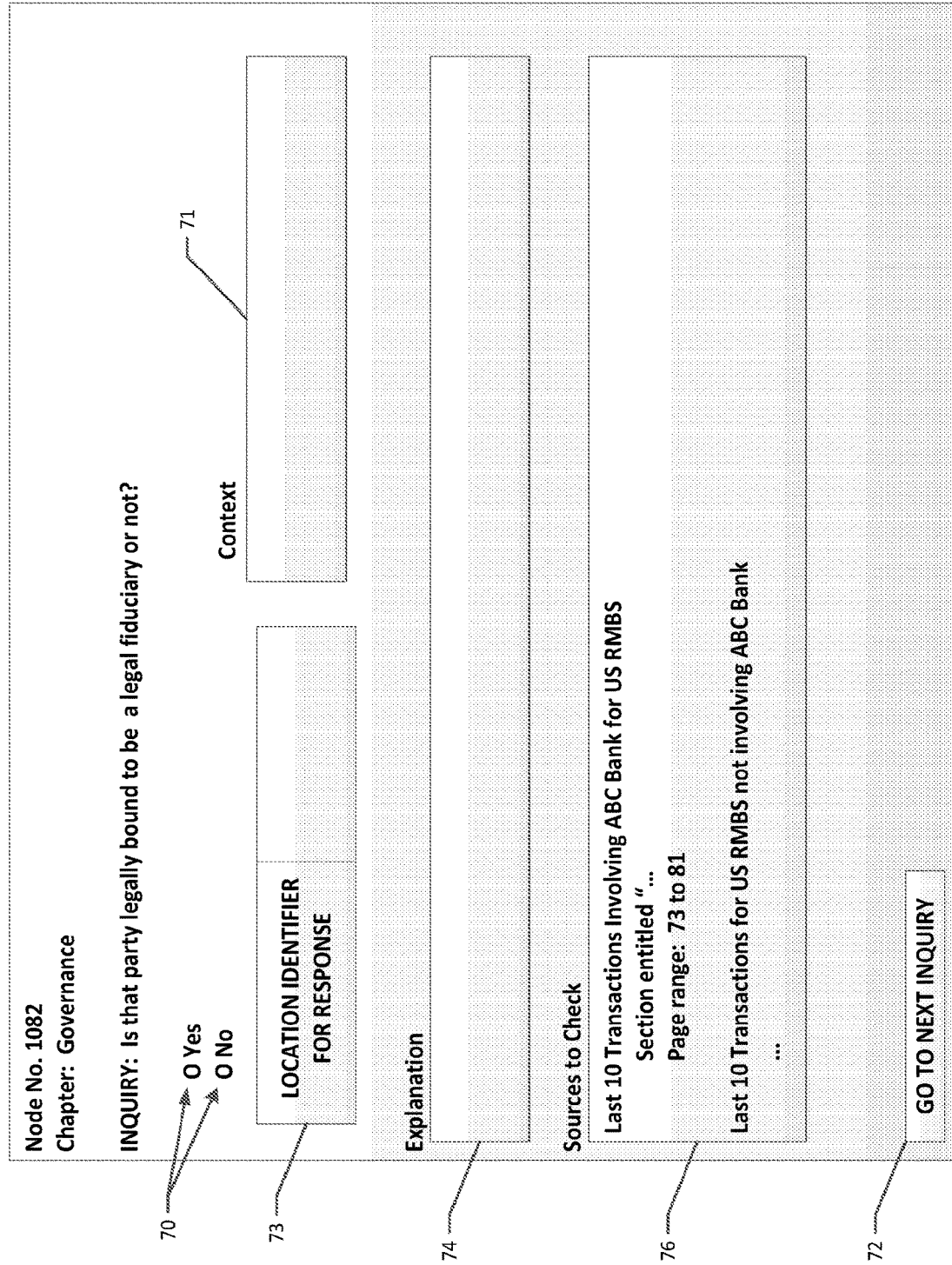

Accordingly, in various embodiments, when the user reviews the specialized-response option in the specialized inquiry, the node might additionally display the most likely places where the supporting or dilutive evidence can be found based on responses from prior information sources. FIG. 6 shows an example display of an edit node for a yes/no inquiry that is displayed when the user clicks on the edit node. As shown in the example of FIG. 6, the edit node display shows the node number and the subject/chapter/category. It also shows the specialized inquiry and provides pre-programmed response option radio buttons 70 or other web page input icons (e.g., drop down menu item selections) that the specialized investigator could use to input the specialized-response option. The inquiry and corresponding specialized-response options can be specified by a subject-matter content designer using the application computer device 19 (see FIG. 1). When, in performing a review of the subject information and after the subject-matter content designer has specified the inquiries and corresponding specialized-response option options, the user inputs one or more free form responses and or selects one of the specialized-response options, which can be finalized by pressing the "Finalize & Submit" button 72. The scoring system 22 can store the specialized-response option for the specialized inquiry/node for the document being reviewed by the specialized investigator.

The population of allowable items that can be searched is restricted based on the specialist's data access privileges and the user's output report credentials. Parties that can view only publically available information should probably not have analysis or reports based on private or confidential information. Limits on the search authority are part of this invention.

Traditional search rarely focuses on missing or omitted information yet missing information can be a key item in assessing risk. This invention has analysis scripts for known drivers of risk. If there is no discussion of such in the documents, this omission could be a material influence to scoring risk. Knowing what is omitted can be highly valuable in assessing and scoring risk.

As shown in the example of FIG. 6, the response form for the investigation node can include a field 73 where the user enters the data's location identifier(s) in the source information data set, such as a document, where the supporting evidence or authority for the specialized-response option to the inquiry for the node is found. The response form for the node may also include a free text block 74 where the user may enter relevant text explaining the usage and or value of the specified evidence for that specialized-response option. The response form may also include a context field 71, which can show/display to the specialized investigator some contextual or background information as determined by a subject-matter content designer regarding the inquiry's relevance and/or keywords relevant to the specialized investigator's analysis. This contextual and analytical instruction can make the specialist more sophisticated and aware of the nuances related to the matters associated with that specific inquiry. The keywords can be gleaned from explanations from reviews of prior, similar transaction/financing analysis. That is, the specialized investigators' explanations are indexed to the specialized inquiries and stored in a database of the host computer system. A search feature applied to that investigative node in the future can then search the explanations for a particular specialized inquiry to determine the most relevant concepts related to specialized-response optioning the inquiry. A subject-matter content designer can use relevant concepts from the search in the context field 71 to assist the specialized investigator in specialized-response options regarding that specialized inquiry.

Also as shown in the example of FIG. 6, the display may include a field 76 that shows the top location(s) where the supporting evidence is likely to be found based on queries of the information index database 26 for: the same specialized inquiry subjects such as the same type of the collateral; for the same bank etc. Secondary locations (in terms of priority) would be for the same supporting evidence, for the same type of collateral, but for different banks. For each investigative node, more recent searches results can be weighted higher to speed up the user experience in the future. For example, the top suggestion on where to find responsive information could be a page range that encompasses the last 5 or 10 responses to the specialized inquiry for the same type of document (e.g., type of collateral) for the same bank. It could also or alternatively show the precise document location identifier where evidence related to the specialized-response option was found for the last 5 or 10 (or any number) of prior documents for same collateral type for the same (or different) banks. The descriptions that the specialized analyst inputs when reviewing prior transaction/financing related documents can also be used by the investigative node's search algorithm to identify the relevant transaction/financing related information to display in the field 76. Also, some or all of the displayed locations could have a hyperlink that when clicked by the user causes the host computer system 10 to retrieve and display (such as in a pop-up window or in another web browser tab or window) the corresponding section of the other transaction/financing related document so that the user can compare the documents to see if their specialized-response option related to that inquiry in the same way or not.

Also, with sufficient data, transaction/financing related information from different banks for the same type of collateral may look similar. That is, one bank's RMBS documents could look similar to another bank's RMBS documents. For each type of document (e.g., collateral type), and for each bank in the database, the scoring system may compute a similarity score to each of the other banks, where the similarity scores are based on the similarity of the documents from the two banks for each transaction type. The similarity could be based on the specialized-response options and where the supporting evidence is found. Thus, when reviewing a document for ABC bank, the investigative nodes could also show the most likely locations where the supporting evidence may be found in the documents for ABC bank's most similar bank(s) for the particular loan/deal type. Similarity and identical documents benefic from different analysis methodologies. This invention provides for such.

When the specialized investigator enters her/his response into the investigative tool, and finalizes the response by hitting the button 72, the information source database 26 can be updated accordingly. It can record the location identifier(s) for the information from the field 73 and any explanation provided in field 74. When the specialized investigator hits the next inquiry button 72, the specialized investigator can then be automatically taken to the next specialized inquiry corresponding to the investigative tool given the specialized investigator's selected response option to the instant inquiry.

In some cases, the data source, such as a document, may not provide a sufficient specialized-response option for an investigative script(s). In those instances, the user can indicate in the explanation field 74 that no specialized-response option was provided or the user can input an alternative custom response. This input can create a prompt for the subject-matter content designer and/or supervisor to update the invention's scripts for future applications. Due to the cyclical nature of the transactional and financial matters, this ability to input custom options effectively causes the invention to become more and more insightful for future analysis. Although transactions and financing documents lack standards, they often include common features that follow historical trends. For instance, contract features related to workout strategies may be written in detail when prime and sub prime collateral is included in a financing but over time, the reference to workouts on prime collateral may fall away. In periods of recession, the contract provisions related to prime might re appear in future financings.

Figure 15:
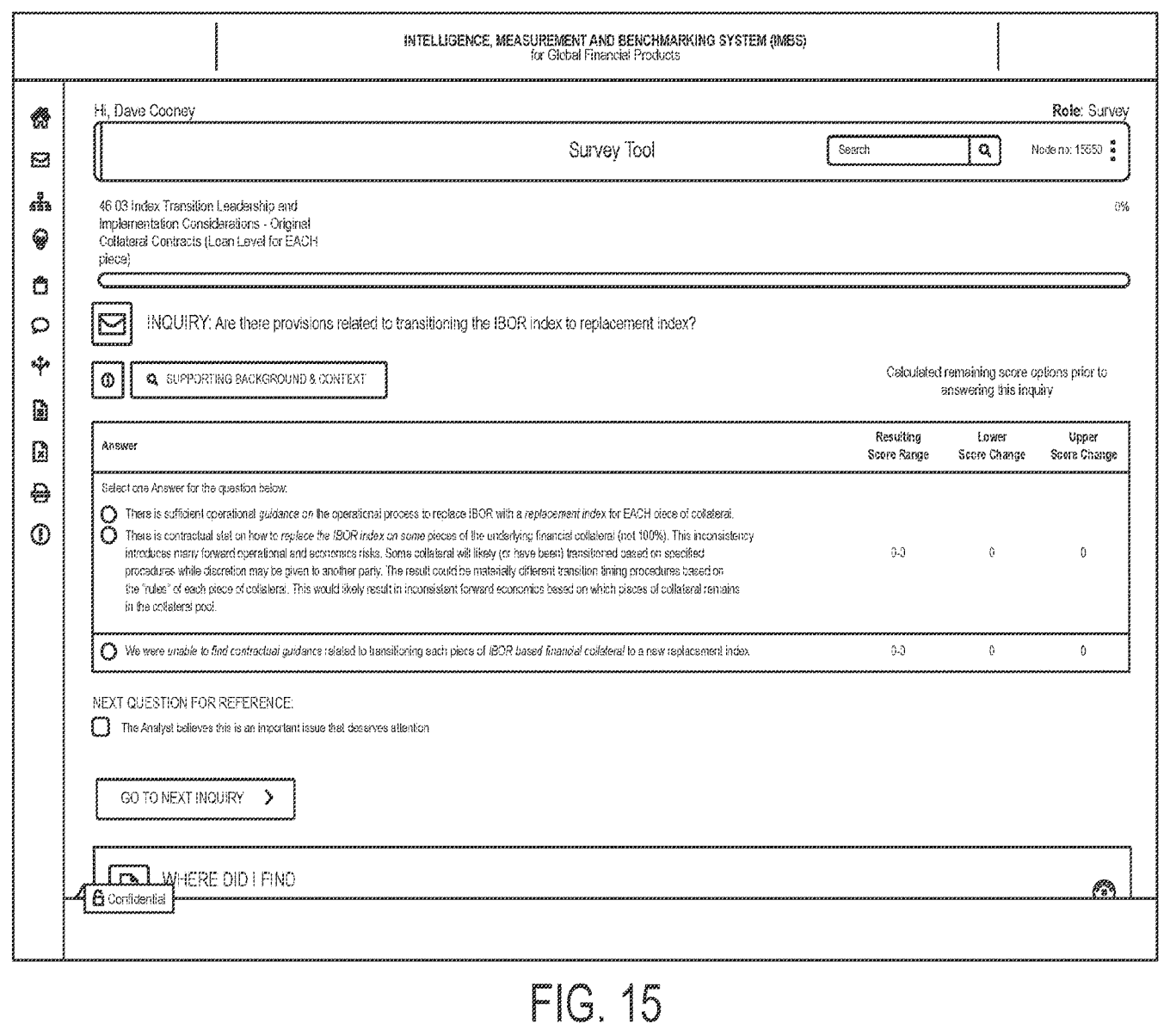

FIG. 15 shows another example of a query node that the analyst completes while completing a survey. The example shown in FIG. 15 is node number 15553 (see upper right) in the particular query node tree. The query is query 46.03 in the menu of queries (see FIGS. 12 and 13 where an administrator generates the queries in the node tree for a transaction or transaction type). In the example of FIG. 15, there are three possible responses to the query. The analyst can click the "Supporting Background & Context" button or link to, for example, see the possible places to look for the answer to the query as in field 76 of FIG. 6. The example of FIG. 15 also includes a place where the analyst can mark whether the substance of the query is important (or believed to be important by the analyst) and, as such, deserves further attention. When an analyst clicks or otherwise activates this button, the host computer system 10 can send a notice to an administrator or manager to analyze the issue further. The example of FIG. 15 also includes the button at the lower left where the analyst can proceed to the next query in the query node tree. As explained herein, the particular query node that is next can depend on the answer given by the analyst for the instant query. The means through which the analyst may specific a response to the query can include the radio buttons as shown in the examples of FIGS. 6, 7 and 11; drop-down menus; text fields; checkboxes; and/or any other suitable (e.g., HTML, webpage) response entry technique.

Figure 7:
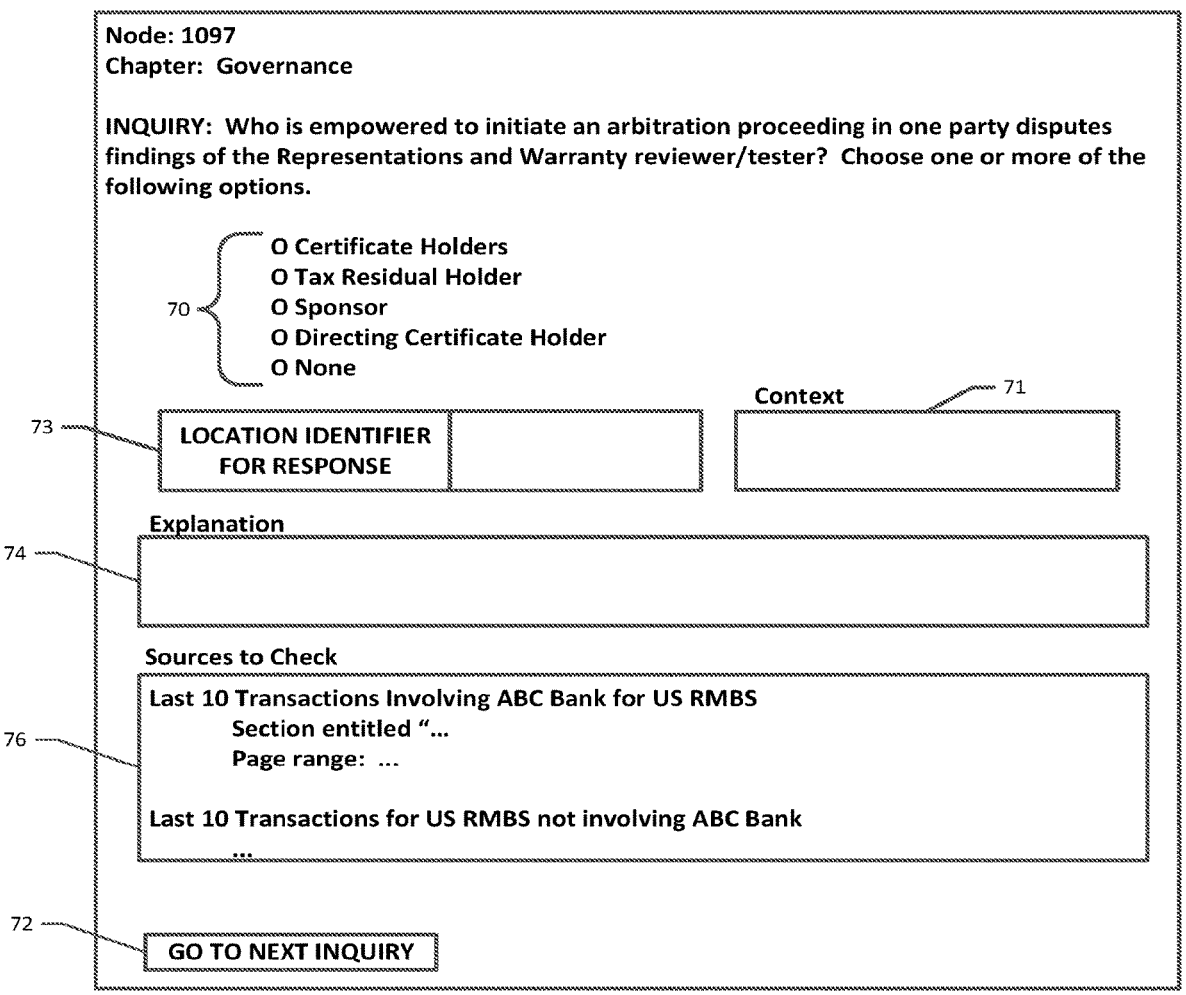

FIG. 7 shows an example of another edit node display. In the example shown in FIG. 7, the inquiry has five option possibilities ("specialized-response options"). The specialized investigator can enter the appropriate response by clicking the radio button 70 (or other input) corresponding to the appropriate response option. As before, the specialized investigator can also enter the location of the information where the supporting information to that response is found in the field 73. In some applications, an inquiry could have dozens or even hundreds of responsive location options. Again, a subject-matter content designer can determine the appropriate weighting of the location options to be provided to the specialized investigator and the user interface can be adjusted in the display of those options to the user as such. The subject-matter content designer can determine the appropriate options from, for example, a library of specialized inquiries and corresponding responsive information options that are built up over time as final matters are reviewed and their corresponding evidence locations and explanations are recorded in the database.

Supporting evidence is often broken into two categories: (1) confirmatory evidence and (2) dilutive, collaring, conditional, capping or flooring evidence. In fact, the response to one node's inquiry could include both affirmative and diluting information and that information may be found in many different sources. The system's ability to fund, link and use those multiple findings for future content enhancements is a useful part of this system.

In some instances, the specialized investigator may need to resort to evidence outside of the data set of base documents related to the matter. Depending on the type of information being reviewed, the extrinsic evidence could include industry research, public research (e.g., online searches of databases), specialized research, public or private bond offering documents, bond operating documents, loan documents, borrower documents, operator document, tenant documents, etc. When electronic copies of these information sources are stored in the document database 16, the specialized investigator can identify where in the extrinsic evidence or other the supporting, conflicting or dilutive evidence for this is found. Where the supporting evidence are not in the document database 16, the specialized investigator could download them for storage in the document database or otherwise indicate where the documents can be found for verification and/or audit purposes. In a similar manner, the extrinsic documents can be word-searchable, such as by OCR-ing them with the OCR component 30 (described further below), to facilitate computerized searching of the extrinsic evidence documents. In some versions, the OCR tool and a real person can look for the information together or separately. The interface can allow the specialist to note if the data appears to be damaged, incomplete, unreadable etc. This can facilitate final analysis and follow on decisioning.

In various embodiments, the listed responsive evidence citations in field 76 can have corresponding benchmarking scores that indicate the likelihood that the responsive evidence citation will provide the proper evidence to support the response option. The evidence confidence citations can be scored based on, for example: how many times the prior evidence citation was observed; for the same issuer/bank; for similar transactions; for documents that are highly similar in general; and with more recent citations being weighted higher to facilitate future search.

Also, although not illustrated in the examples of FIGS. 6 and 7, the specialized investigator's interface screens may include a feedback button where the specialized investigator could provide feedback to the subject-matter content designer and/or a business supervisor. The feedback loop process may include, for example: suggested revisions to the inquiry; suggested changes to the possible specialized-response options (including deletions, additional and/or rewordings); and/or inquiries to be added or subtracted. This computerized feedback loop creates continuous learning for the system.

Figure 8:
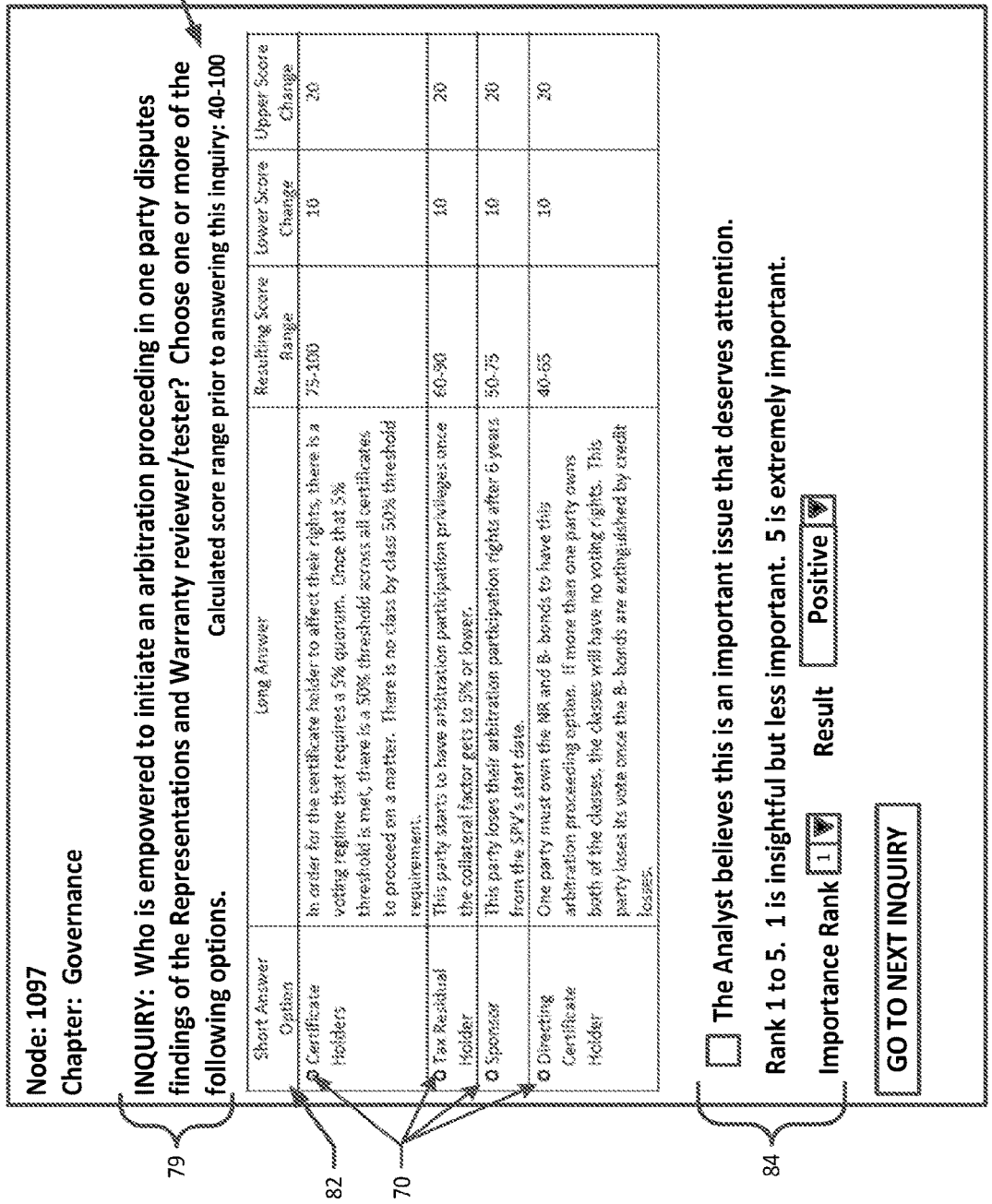
FIG. 8 is a screen shot displayable to a programmer and/or subject matter specialized investigator in designing investigative scripts according to various embodiments of the present invention.

When the specialized investigator completes the full path of specialized inquiries for an investigative subject, the benchmarking or scoring system 22 can generate a screen shot, digital, paper or other report for the subject/chapter. FIG. 8 shows an example of how a subject-matter content designer can set up the specialized inquiries in the scoring system 22 to generate the analysis output report. The example of FIG. 8 indicates the node identification number and investigative subject chapter at the top. The subject-matter content designer can write, edit or update the menu of investigative scripts in field 79. There can be checklists per node. The display also includes an indicator 80 that provides a description to the score range for the risks related to the specified matter as addressed for this specific node (i.e., node 1097 in this example) in this chapter/category. That is, in this example, all termination nodes downstream from this node (e.g., to the right in the path flow) could have a scoring value of between 40 and 100 in this example. Further, the example in FIG. 8 has four possible specialized-response options 70. Each of the possible specialized-response options can also show the score range corresponding to each specialized-response option. For example, if the specialized investigator selects Certificate Holders as the specialized-response option, when the specialized investigator proceeds to the next node (by clicking the button 72 in FIG. 7), all downstream termination nodes from the next node will have a value of between 75 and 100. If, however, the specialized investigator selects Tax Residual Holder as the specialized-response option, all downstream termination nodes from the next node will have a value of between 60 and 90, and so on for the other specialized-response option alternatives shown in the example of FIG. 8. The chart 82 in the example of FIG. 8 also shows the content designer how the specialized-response option will affect the overall score for the category for the risk being analyzed. For example, with reference to the example in FIG. 8, if the specialized investigator selects "Directing Certificate Holder" as the specialized-response option, the chart 82 shows that the final score range for the chapter/topic (which depends on the other specialized-response options along the specialized inquiry branch) is between 40 and 65. Conversely, if the specialized investigator selects "Certificate Holders" as the specialized-response option, the final score range is between 75 and 100 (with higher numbers indicating less risk in this example). Collectively, as the specialized analyst progresses down the path of inquiries, the final score benchmark options start to show a trend and becomes refined tighter and tighter as the path is concluded. This education of resulting score results, during the analysis process, helps keep the specialized analyst cognitively aware of the impact of her/his selections to date. This education can assist in free form answers at a later date, The chart 82 in FIG. 8 also has a "Long response option" for each short response option. The Long response option corresponding to a short response option selected by the specialized investigator when reviewing the applicable evidence shows up in the chapter summary report as described further below. The subject-matter content designer can edit the long response options in the chart so that they are appropriately worded for the resulting chapter summary report. In particular, the long response option preferably gives support and/or context for the short response option.

The designer UI includes a library of common answer options. When designing the content of a node, that library can be referenced and the content designer is provided tools to copy that content into the answer area of any investigative node. As more subjects and matters are analyzed that content library grows, the library allows the designer to be faster when designing a new node and facilitates consistent content exporting when a survey is completed. The designer's includes an option to make the copied over list of answer options static for that node or dynamic. A dynamic authority will cause the node's chosen answer option list to get longer or shorter as the base library for that item is modified in the future. For instance, the library could include the name of all 50 states and the list is simply copied over if there is an inquiry related to state location.

The example of FIG. 8 also has a section 84 where the subject-matter content designer can indicate the importance of each responsive option to the overall risk of that analysis "chapter" or the risk as a whole. FIG. 8 shows one section 84 for doing this, although the content specialized investigator preferably completes this section for each possible specialized-response option 70. The section 84 in the example of FIG. 8 allows the subject-matter content designer to display the subject-matter content designer's pre-determined view of the importance (e.g., a rating of 1 to 5, with 5 being most important) of each specialized-response option and whether the consequences of the selected response option are positive or negative to the overall risk profile of the matter being analyzed. This information is used in generating the report for the analysis "chapter" as described further below. In such a scenario, a first particular specialized-response option to a particular inquiry may be highly important while a second, different specialized-response option to the same specialized inquiry is not as important. In various embodiments, the display of FIG. 8 allows the subject-matter content designer to specify the importance on a specialized-response-option by another specialized-response option basis, with the long response option and importance rating for that response option selected by the investigator at review time appearing in the chapter summary report as explained further below.

Figure 12:
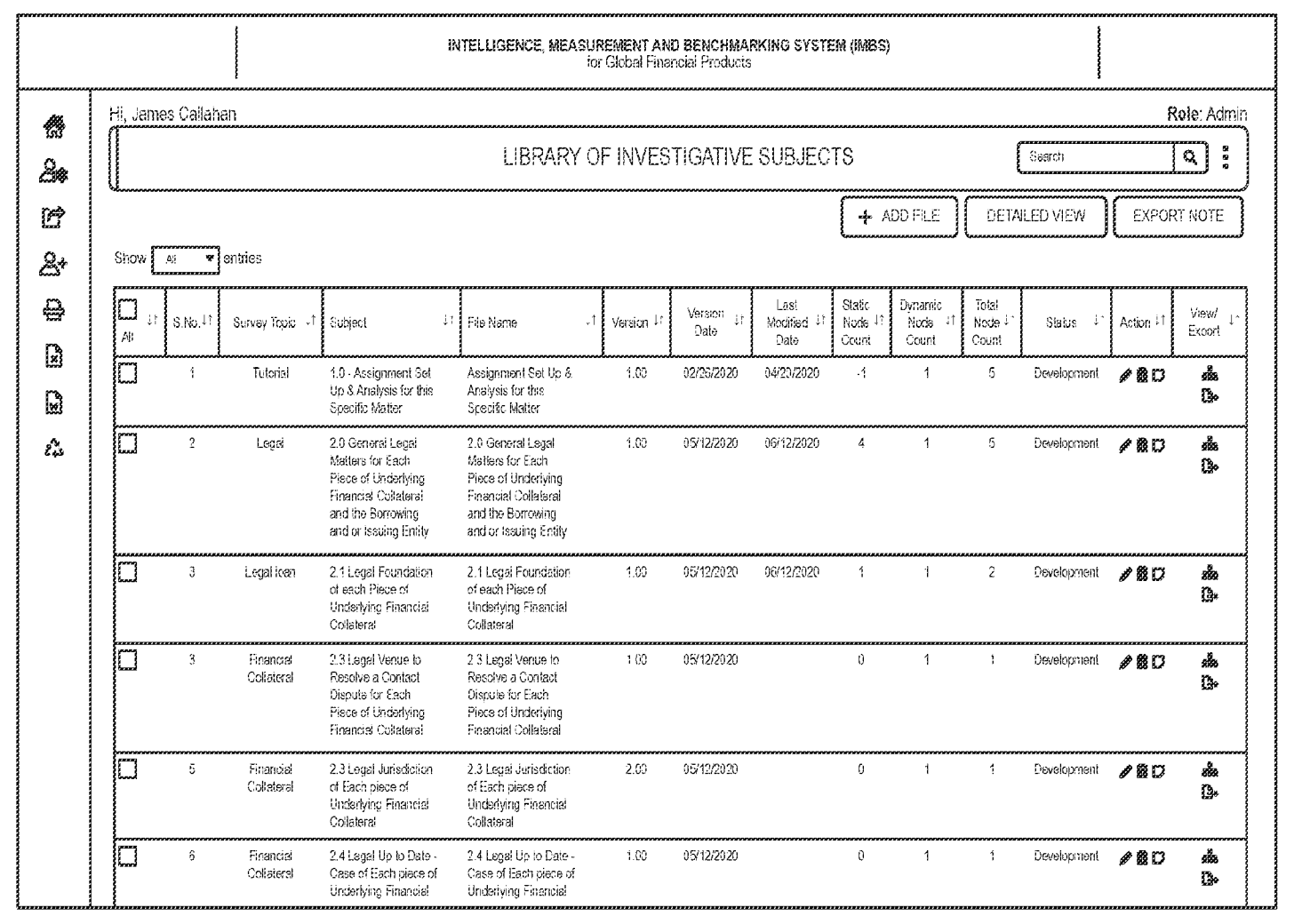
Figure 13:
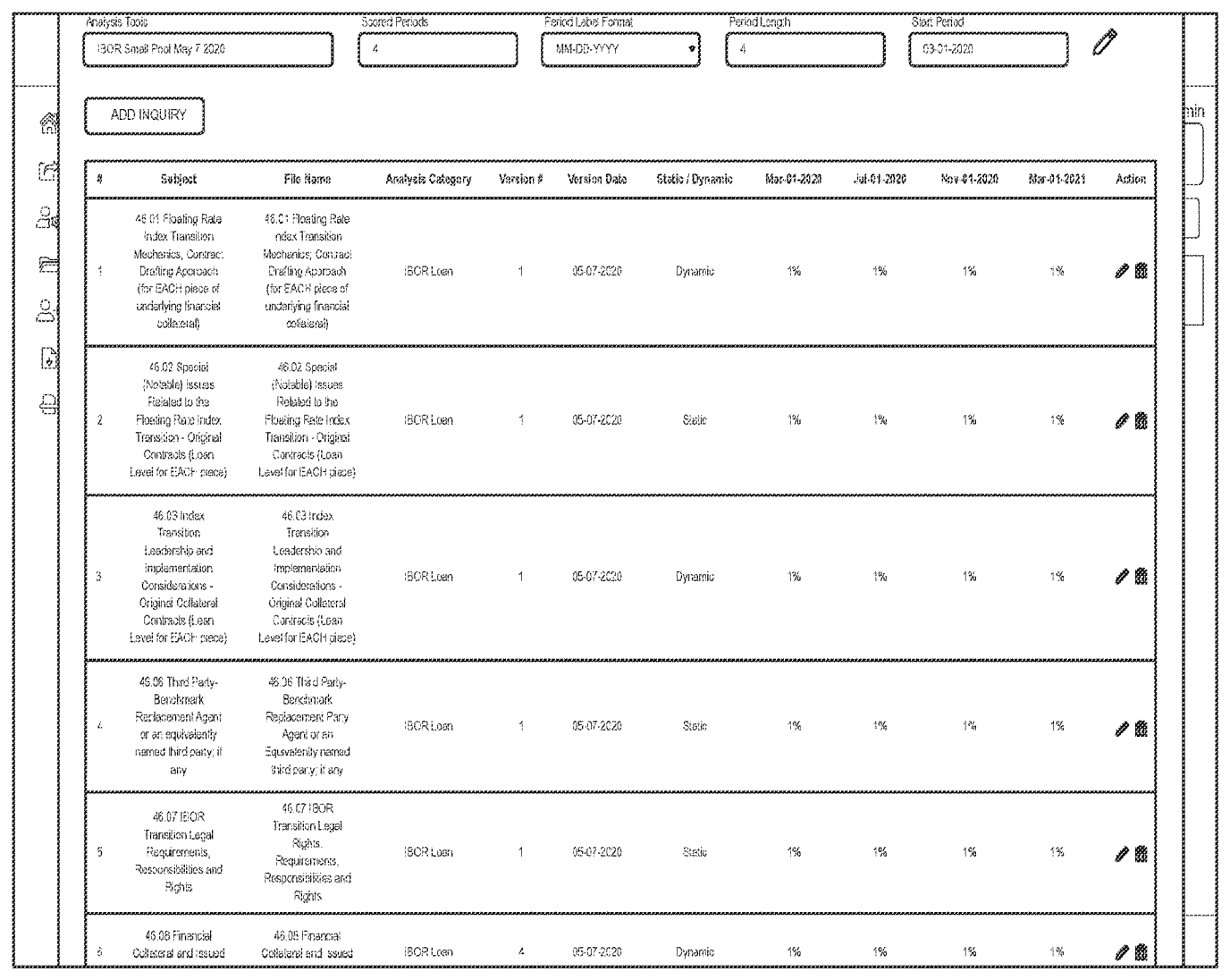
Figure 14:
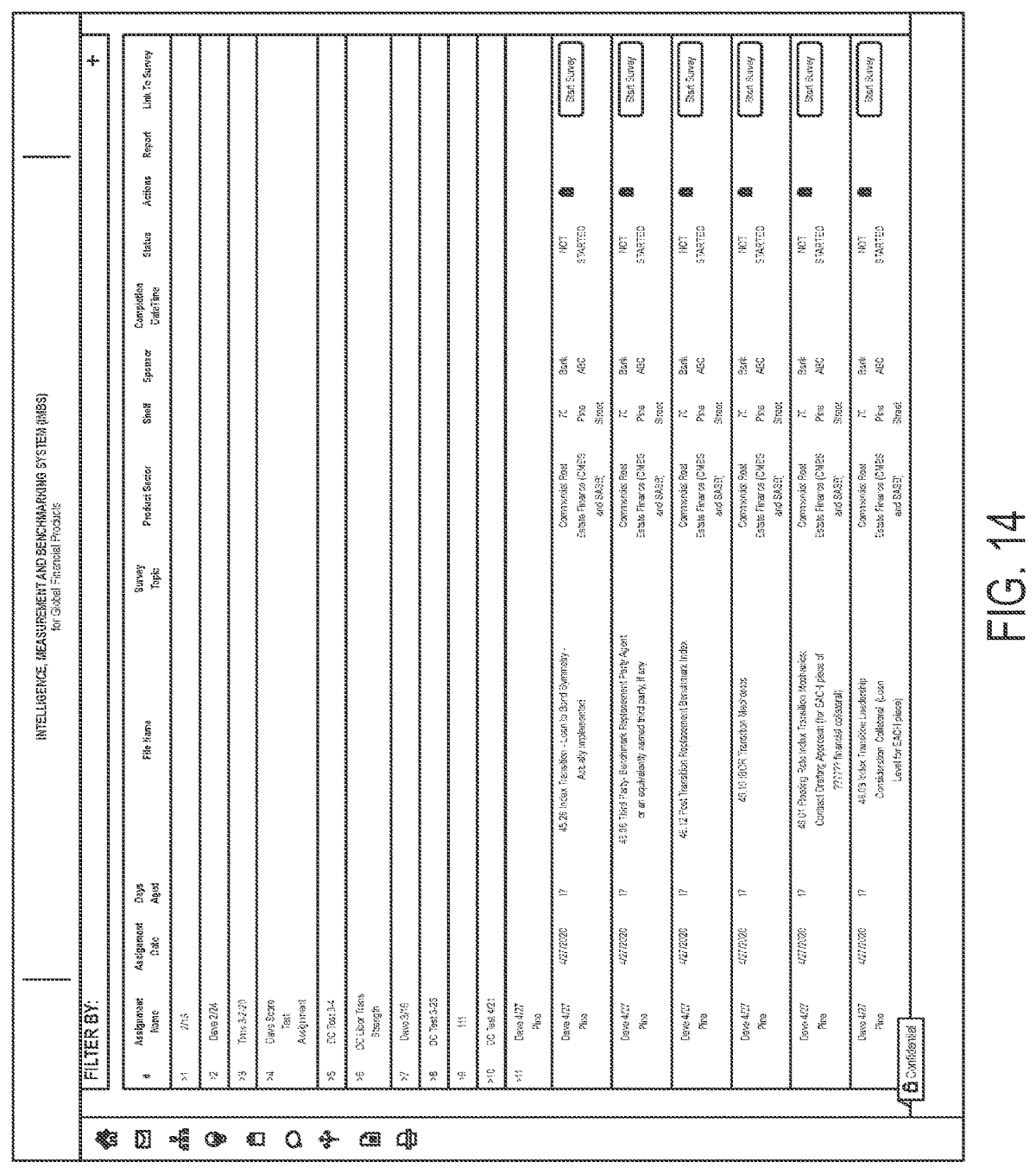

FIGS. 12 and 13 show screen shots of the user interface that an administrator, at the administrator device 19, can use to pre-stored query node trees for various subjects to establish which topics (or chapters) are used (analyzed) for a particular transaction or transaction type. FIG. 12 shows how the administrator can select pre-established query node trees for various subjects within and across various applicable topics (e.g., legal, legal loan, financial collateral, etc.). The user interface can show, as shown in FIG. 12, the version for each query node tree, the last time the query node tree was modified, the number of dynamic and static nodes in the query node tree, etc. FIG. 13 shows an example user interface where the administrator has completed the selection of investigative topics from FIG. 12. FIG. 14 shows a screen shot that an analyst (from analyst device 18) may use to sort and start the surveys/jobs assigned to the analyst. When clicking the "Start Survey" hyperlink for a particular job, the webpages with the queries assigned to that job by the administrator (see FIGS. 12 and 13) can be retrieved and conveyed to the analyst (at the analyst client device 18) for completion of the applicable surveys as described herein.

Figure 9:
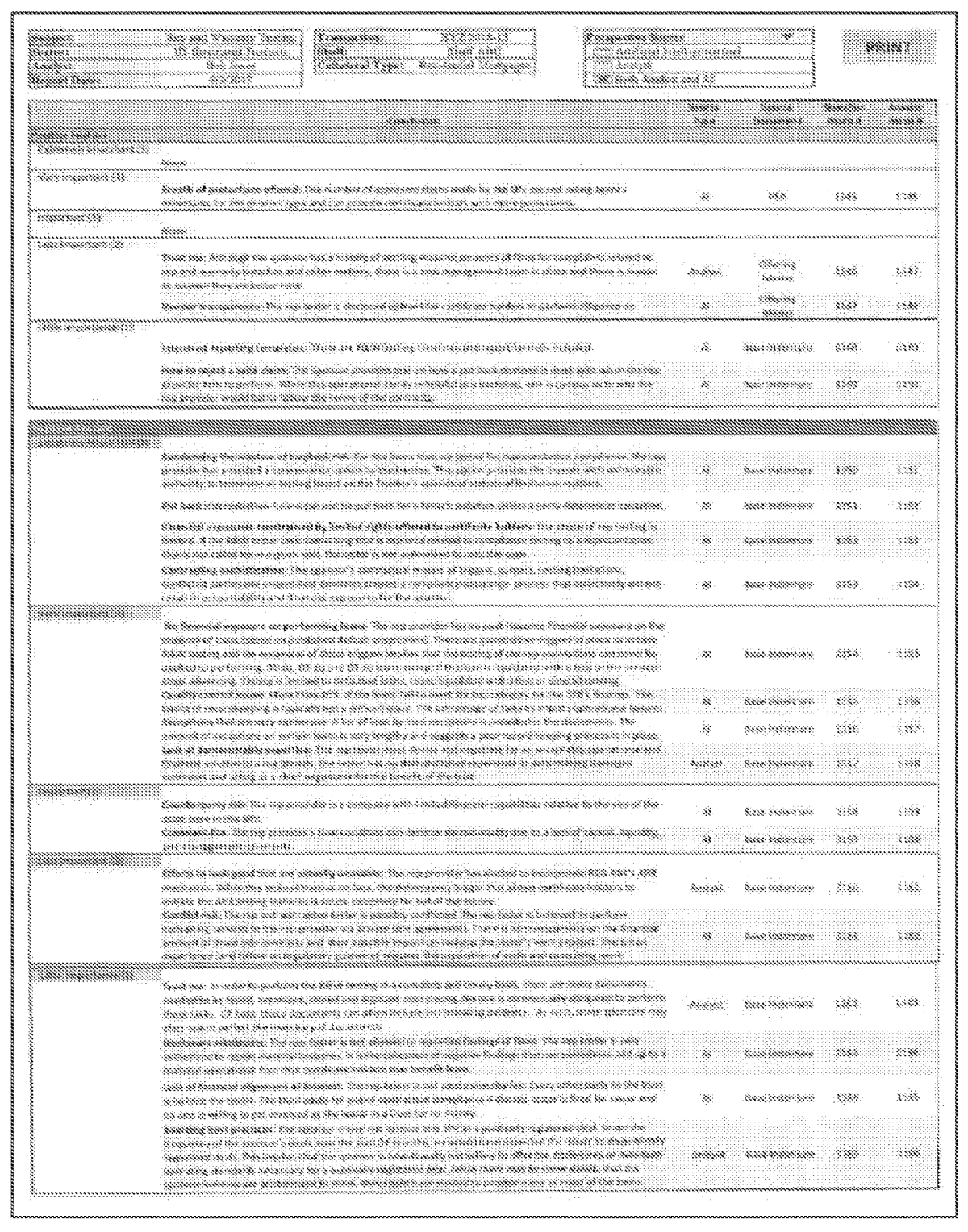

FIG. 9 shows an example report for an analysis chapter, which can be generated by the scoring system 22 after the specialized investigator completes the specialized inquiries for a chapter. The report compiles and displays the response options in the chart 82 that corresponds to the response option selected and where the subject-matter content designer specified her/his long specialized-response options. Also, the report aggregates the long response options by significance/important, as being either positive, negative, or simply notable and then within each of the positive, negative and notable categories, by importance rank, e.g., most important (e.g., rank 5 in FIG. 8) to less important (e.g., rank 1 in FIG. 8). As shown in the example of FIG. 9, the report can compile, as "Conclusions," all of the response options in the chart 82 for positive features from rank 5 to 1, and all of the response options in the chart 82 for negative features from rank 5 to 1. The same for notable. As shown in FIG. 9 the report can also show the specialized inquiry node number for the node that gave rise to the corresponding conclusion, as well as the next node that resulted from the specialized investigator's response to that specialized inquiry.

For reference, the report can also show the chapter/category (in this example, representation and warranty testing), the sector (US structured products in this example), the specialized investigator's name, the report date, the transaction id, the issuance shelf (or bank), and/or the collateral type (residential mortgage in this example), as well as other information that may be useful.

Referring back to FIG. 4, the termination nodes shown there correspond to responses to simple yes/no inquiries. In various embodiments, a branch of the specialized inquiry could terminate with a response to a specialized inquiry that is not a yes/no response, such as shown in the example of FIG. 7. For example, one or more of the specialized-response options in the example of FIG. 7 could terminate a branch of the specialized inquiry and have an associated score for the analysis branch.

In various embodiments, the scoring system 22 may also comprise an OCR component 30. The OCR component 30 may OCR a transaction/financing related document or other information including those listed previously that is not otherwise word-searchable such that the words of the document are word-searchable (for documents that are not already word-searchable). That way, for a particular specialized inquiry, the scoring system 22 can do a word/phrase search for the relevant terms that are responsive to the particular investigative scripts.

The documents and/or each page thereof stored in the database 16 may be its own file, such as a PDF, BMP, TIFF, JPEG, and PNG files, for example. The OCR component 30 processes the files to recognize the characters and the words in the files so that the contents of the files can be searched. As a first step, the OCR component loads the files to be OCR-ed. Depending on the method in which the image files were created, there are a number of issues that may arise. More often than not, an image file will be skewed or contain "noise" (a/k/a varying brightness or color). As a second step, the OCR component preprocesses the image files to, for example, de-skew, remove any "noise", and improve the overall quality of the images. In various embodiments, the preprocessing step can include the detection and removal of lines on the images/pages, which tends to allow for better recognition quality when converting tables, underlined words, etc.

Next, the OCR component 30 analyzes the page/image being OCR-ed. In this step, the OCR component notes and processes the layout of the original file, including the detection of text positions, white space, and the prioritization of important text areas or sections. The aim of these pre-processing steps is to convert the file to a binary file—that is, every pixel on the image is one of two colors (e.g., black or white). The white areas can be ignored, while the black areas are analyzed to detect the characters. Next, OCR component 30 detects (or singles-out) words and lines of text in the file as a beginning stage of actual character recognition. Next, the OCR component 30 may detect and fix "broken" or "merged" characters. Depending on the quality of the original file, there are often errors in which characters are broken or blurred together. The OCR component 30 may break down and resolve these errors in order to properly interpret the appropriate characters. Finally, once individual characters are identified, the OCR component recognizes the characters. The OCR component may use matrix matching and/or feature extraction for this step. Matrix matching (or pattern matching) identifies the image-based files as the equivalent plain text character when an image (a stored collection of bitmapped patterns or outlines of characters) corresponds to one of these selected bitmaps within a certain degree of likeness. Alternatively or additionally, the OCR component may use feature extraction, which searches a character on the page for common elements, like open spaces, closed forms, lines-diagonals intersecting, etc. to recognize the character. Using either (or both) technique, the OCR component initially advances numerous hypotheses about what a character is. Based on these hypotheses the OCR component analyzes different variants of breaking of lines into words and words into characters. After processing huge number of such probabilistic hypotheses, the OCR component finally makes the decision. When a character is identified, the OCR component 30 can convert it to ASCII code so that it can be used for further manipulations, such as the identification of words from the recognized characters using a dictionary.

Where the "documents" to be search include other types of media, such as audio or video content, the computer system can use automated transcription software to convert the audio to text that can be processes and searched. The transcription software can use natural language speech recognition, for example, to convert speech in an audio file to text.

The scoring system 22 can learn the relevant terms for inquiries based on the prior responses to the same inquiries for the same bank, or, less preferably, from a different bank. For example, referring to FIG. 5, the response option to the specialized inquiry #001 in the Governance chapter for ABC bank for a RMBS for the last such deal (Doc ID 00004) was a page 73. For a new deal (with a new transaction/financing related document) by ABC bank for RMBS, the scoring system can search the document for the new deal (e.g., Doc ID 00005) for terms and phrases that were found on p. 73 of the prior deal's document (Doc ID 00004). The text or page numbers of the top scoring section(s) of the new document could be presented to the specialized investigator in the node box (e.g., see examples at FIG. 6-7) for specialized inquiry #001 so that the specialized investigator has a smart, initial location to look for the specialized-response option. The node box could also include a link to the top scoring section(s) in the transaction/financing related document 12.

The content designer upfront and specialist user on going can input or highlight helpful key word and search criteria into the invention. This search list can be automatically enhanced as the user finds, highlights and stores responsive sentences, paragraphs and sections that are responsive. Effectively, the OCR search grows in sophistication and speed as responsive contract test is highlighted and stored in the word/phrase database. The OCR finding that nothing was responsive to that inquiry's data needs is equally important to know sometimes.

In addition, in various embodiments, the scoring system 22 may comprise a document (or text passage) similarity comparison module 31 as shown in FIG. 2. The document similarity comparison module 31 may compare the word-searchable subject found (e.g., a particular text passage of a document) in a document 12 to prior word-searchable documents, stored in the document database 16, from the same (or different) bank for the same (or similar) collateral type to identify text passages in the subject document that are similar to the passages in the prior transaction/financing related documents where the specialized-response option to the inquiry appeared. For example, if the answer location for specialized inquiry #001 in the Governance chapter for ABC bank related to a RMBS for the last such transaction/financing related document (Doc ID 00004) was a page 73, the document similarity comparison module 31 can compare the text at p. 73 of the last transaction/financing related document to the current (subject) transaction/financing related document to find the most similar (or the N most similar, where N>1) text passages in the current transaction/financing related document and present them to the specialized investigators in the display for the node for the specialized inquiry as initial places to look in the current document 12 for the specialized-response option. This could also be done for the last M transaction/financing related documents (where M≥1). The document similarity comparison module 31 may use any suitable technique for comparing passages of the documents using Natural Language Processing techniques, such as Jaccard or cosine similarity scores.

In some embodiments, the scoring system 22 may automatically provide specialized-response options based on the similarity between the new document and the immediately prior transaction/financing related documents for the same bank for the same product (or a number of prior transaction/financing related documents). For example, if the new document being scored contains a passage that is sufficiently similar (e.g., a similarity score above some threshold, as determined by the document similarity comparison module 31) to the passage of the prior document that contained the specialized-response option to the specialized inquiry, then the scoring system 22 can specialized-response option the specialized inquiry in the same manner as the prior document. The benchmarking and scoring system 22 can also provide a confidence score that is related to the similarity score (e.g., the higher the similarity score, the higher the confidence). Also, instead of one data source being used, the automatic specialized-response option and confidence score could be based on more than one document, e.g., the similarity to the last N documents for the same collateral type for the same bank, etc.

When a similarity score between the document being analyzed and a prior document (or the similarity scores between the document being analyzed several prior documents) is very high, e.g., above a threshold score level, and the analyst responses for queries focusing on the relevant passages are consistently uniform, the scoring system can select the appropriate answer (the prior consistently uniform answer) and correspondingly move to the next relevant query in the node tree. That functionality accelerates the review by the analyst. The system automatically selects the response to the query, thereby absolving the analyst from having to spend time on the query.

In a related manner, particularly for queries that have many possible responses (as opposed to merely yes/no responses), the back-end system could reorder the order in which the possible responses appear to the analyst, so that the most likely responses appear at the top of the user interface. For example, when a few or a handful of responses predominant for a query, based on the analysis by the comparison module 31, those predominant responses can be shown at the top of the analyst's listing. In other words, the comparison module 31 could compute a likelihood of responses to a query, based on a comparison of the relevant sections of the document being reviewed to prior, similar document(s) that were scored, and the corresponding responses from the prior document(s), and then display the responses for the analyst in descending order of likelihood. This is another efficient aspect of the user interface; it can speed the analyst's review and response to a query.

In various embodiments, the content designer could specify a glossary of key terms and, in turn, the key terms that are relevant to a particular query. In performing its qualitative comparison of text passages, the comparison module 31 can weight the specified glossary terms greater than non-glossary terms. In addition, in various embodiments, the content designer could specify "dilutive" terms for specific queries, such that they are essentially "linked" to the "affirmative" key words for the query specified by the content designer as described above. The comparison module 31 can apply a penalty when a dilutive term is found in the document so that the dilutive (or counter-) effect of the found dilutive term(s) is(are) factored into the scoring.

After the specialized investigator completes the investigative scripts for each of the chapters, the scoring system computes a composite score for the document. The composite score can be a weighted average of the individual chapter scores, with the more important chapters (e.g., in terms of risk) being weighted more highly. Moreover, the weights can vary with time. For example, for a new securitization, the rep & warranty provisions may be more important upfront than the termination provisions for the SPV. However, years into the securitization, when the securitization is close to expiration for example, the SPV termination provisions may be more important and can be weighted higher for purposes of computing the composite score. As such, a specialized investigator may review the documentation for a transaction at various times during the life of the transaction (which may last 10-20 years, for example). The investigative inquiries that are immutably based on the transaction/financing related document, i.e., static information, do not change, so the specialized investigator does not need to redo those specialized inquiries. Alternatively, the specialized-response options to some specialized inquiries, e.g., specialized inquiries about collateral, may change over time; that is, the collateral items may be dynamic (e.g., is the collateral continuing to be in working order, have all taxes been paid on it, etc.). In subsequent reviews, the specialized investigator can update the responses to those specialized inquiries. Moreover, as mentioned previously, since the risks may change over time, the weightings for the category/chapter risks may change over time, so that the composite score for a transaction/financing could change over time.

Preferably, over time, the specialized inquiries can be modified, new specialized inquiries can be added, old specialized inquiries can be removed, and/or scores for a path can change as more information becomes available. For example, if there is a change in applicable law that makes additional specialized inquiries relevant or makes old specialized inquiry obsolete, a programmer/subject-matter content designer for the scoring system can edit the specialized inquiries or specialized inquiry paths to changes the specialized inquiries and/or the flow paths through a specialized inquiry. The content designer could also change the resulting scores for a path to reflect updated perspectives on the risks for each path. The changing weighing of each subject chapter implicitly creates a process of connecting independent neural nodes, which in turn creates digitized intuition.

In that connection, if a new product comes along where there are no prior information sources directly on point, the investigative scripts for the new product could be created by editing the existing inventory of specialized inquiries and path scores for the most similar existing transaction/product. For example, if a new product requires x new specialized inquiries at certain points in the survey for certain subject chapters, and there are specialized inquiries from the old version that are irrelevant to the new product, the content designer could create the investigative scripts for the new product by editing the investigative scripts from the old base inquiry (and path scores if necessary) to add or delete specialized inquiries as appropriate to accommodate the new product issues. In addition to the node management within file 1, the chapters of specialized inquiries could be added or delete too in such a manner. Moreover, the weights for the composite scores could be changed for the new product. The use of an old inquiry to act as a base inquiry document is that it saves time and money.

Figure 10:
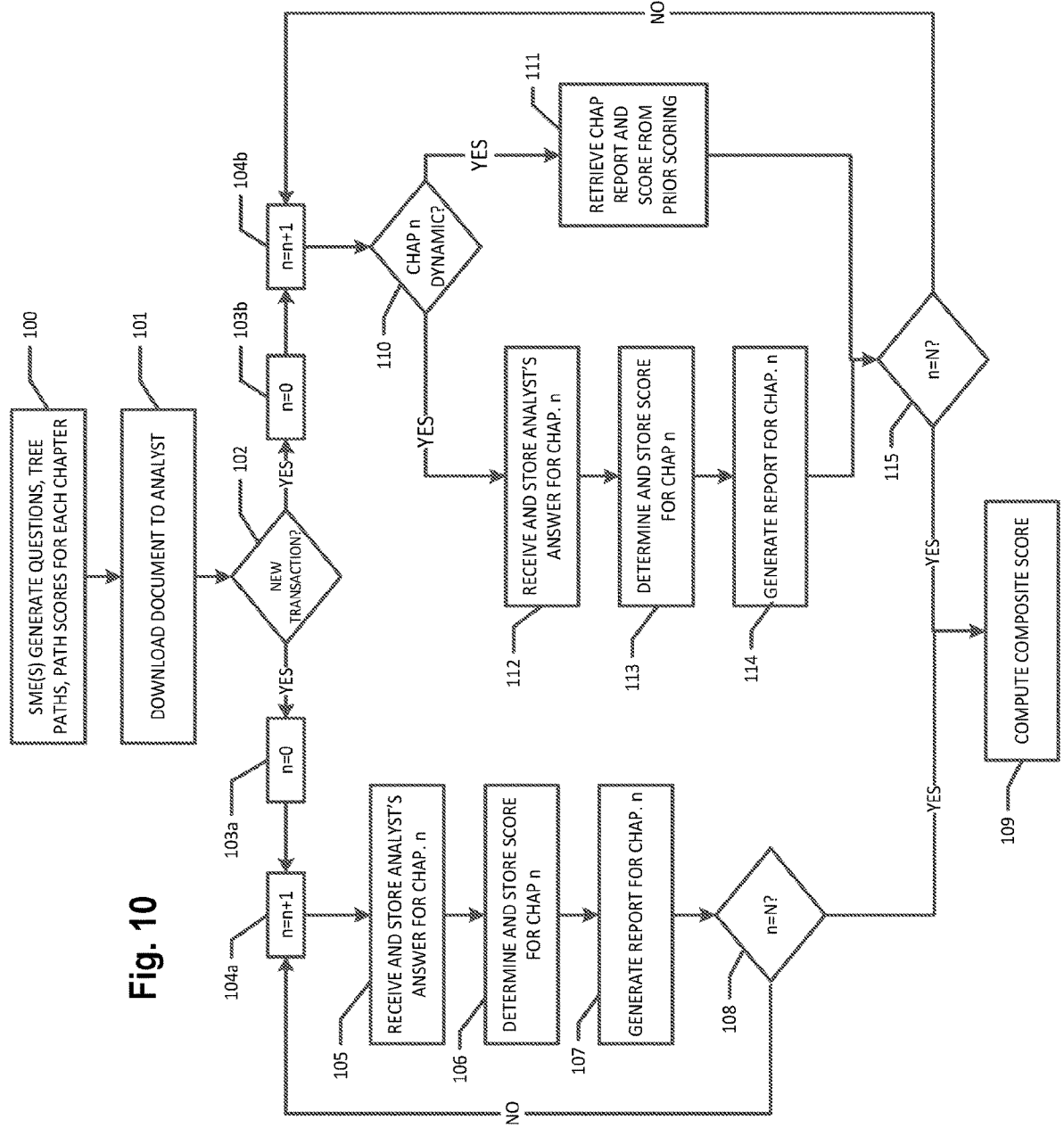
FIG. 10 is a flow chart illustrating a process performed by the scoring system of FIG. 2 according to various embodiments of the present invention.

FIG. 10 is a flow chart illustrating a process of scoring a transaction/financing related matter according to various embodiments of the present invention. At step 100, the subject-matter content designer(s) design the specialized inquiries, the specialized inquiry paths, and the path scores for each chapter. The subject-matter content designer(s) may design the specialized inquiries as described above in connection with FIG. 8. In this example, assume that there are N chapters. The subject-matter content designer(s) also determine the weights for each of the chapter scores in determining the composite score for a transaction/financing related document.

At step 101, a specialized investigator downloads, from the document database 16 via and document server 20, one or more transaction/financing related documents 12 to be analyzed. A transaction/financing related document 12 may be for a new transaction, in which case has not been previously reviewed; or it could be a transaction/financing related document for a transaction that is already underway and previously reviewed (e.g., the securities have already been issued). As such, at step 102 the scoring system 22 determines whether the document is for a new transaction or not. The scoring system 22 can make this determination based on whether there are prior score data elements for the transaction/financing related document indicative of prior scoring by the same or different specialized investigator. In either case, the chapter counter n is initially set to zero at steps 103a-b, and then incremented by 1 at steps 104a-b.

At step 105, the investigator's responses for the specialized inquiries for Chapter n are received and stored; at step 106 the scoring system 22 determines the score for the transaction/financing related document for Chapter n; and at step 107 the scoring system generates the report for Chapter n (e.g., see FIG. 9). As described above, the scoring system 22 may provide the specialized investigator(s) prompts for where the specialized-response options to the investigative scripts may be located based on prior transaction/financing related documents involving the same (or similar) subject matter (e.g., RMBS) and/or the same (or similar) bank. If the specialized investigator has completed all of the chapters (e.g., n=N at step 108), the scoring system 22 can then compute the composite score for the transaction/financing related document at step 109 by averaging the scores for each chapter according to the appropriate weighting scheme for the subject matter (e.g., product) and the timing of the transaction (e.g., new, post-issuance, near maturity, etc.). If at step 108 n does not equal N, that is the specialized investigator has not completed the last subject chapter, the process returns to step 104a where the chapter counter is incremented by 1 and steps 105 to 107 are repeated for the next subject chapter. This process is repeated until all of the chapters are scored.

Returning to step 102, of the transaction/financing related document being reviewed was previously scored/reviewed, the process is similar to that described above, except that, as also described above, the specialized investigator does not need to score the node or chapter that are static (i.e., non-dynamic). For chapters related to static data items (which is different that the static chose-from library items), the scoring system 22 can use the chapter scores from the prior review. Thus, at step 110, the scoring system 22 determines whether Chapter n is dynamic or static. The subject-matter content designer can specify at step 100 whether particular chapters or nodes within a chapter are static or dynamic and at step 110 the scoring system checks the setting specified by the subject-matter content designer at step 100 for Chapter n. If the node or chapter is static, at step 111 the scoring system 22 retrieves the chapter score and report for Chapter n from the most recent prior analysis.

One the other hand, if the chapter is dynamic, at step 112 the specialized investigator completes the analysis inquires for the chapter and the application computes the chapter score in a manner similar to step 105; at step 113 the scoring system determines the score for the chapter in a manner similar to step 106; and at step 114 the scoring system generates the chapter report in a manner similar to step 107. If all of the chapters are scored, that is, if n=N at step 115, the composite score for the analysis is computed at step 109. If not all of the chapters are completed, i.e., if n does not equal N at step 115, the chapter counter n is incremented by one at step 104b and the process is repeated until all of the chapters are scored.

The host computer system 10 preferably stores the assigned risk scores for a transaction/financing related item that it is scored. For example, if a transaction/financing related document is scored at multiple different times (i.e., to assess dynamic risks), the scores for each review can be stored, with a time stamp indicating the time of the review. That way, the change in the scores over time can be assessed as the transaction/financing seasons.

The individual transaction/financing related subject scores, data scores and final reports, as well as the compendium of knowledge that the host system builds up over time from storing the specialized-response options, etc. can be of tremendous value. First, the individual scores for a particular transaction/financing related document provide insight into the risk associated with the particular transaction. Also, the risks between different transaction/financing related documents can be compared/benchmarked to see where risk asymmetries occur. This information can help identify, project and mitigate action that can be taken to reduce the risk or increase the reward.

Second, the compendium of knowledge that the host system builds up over time can help the specialized investigator review the data, such as described above, such as by providing suggestions to where the specialized-response options to particular investigative scripts can be found. Also, as should be evident, such a set up reduces the time for the specialized investigator to review the complex documents and results in more accurate analysis.

Ongoing comments and explanations from the specialized investigators can also be used to inform the system designer to improve improved the investigative scripts; the paths of the specialized inquiries, and/or the associated assigned risk scores to better reflect different situations.

In various embodiments, network security measures can be used to control access to the host control system 10. For example, only authorized user may be permitted to edit the content of a node, modify a path of nodes, upload documents to the system and/or access the documents (e.g., the transaction/financing related documents). Also, only certain authorized users may access the final reports for a particular transaction/financing related document to maintain confidentiality and/or propriety. The system engineer can manage all of those privileges.

The invention allows the system owner to use the functionality of the system. Additionally, the system can be made available to third parties where the third parties can be given access to the system on a license or SaaS basis. In that instance, the third party could create and host their own database of investigative scripts within the invention's database and or use the host system's library of pre-existing investigative threads or combine both. The third party would be given supervisory and designer interface features for their local environment and links to connect such to the system's content designer and system engineer.

Figure 16:
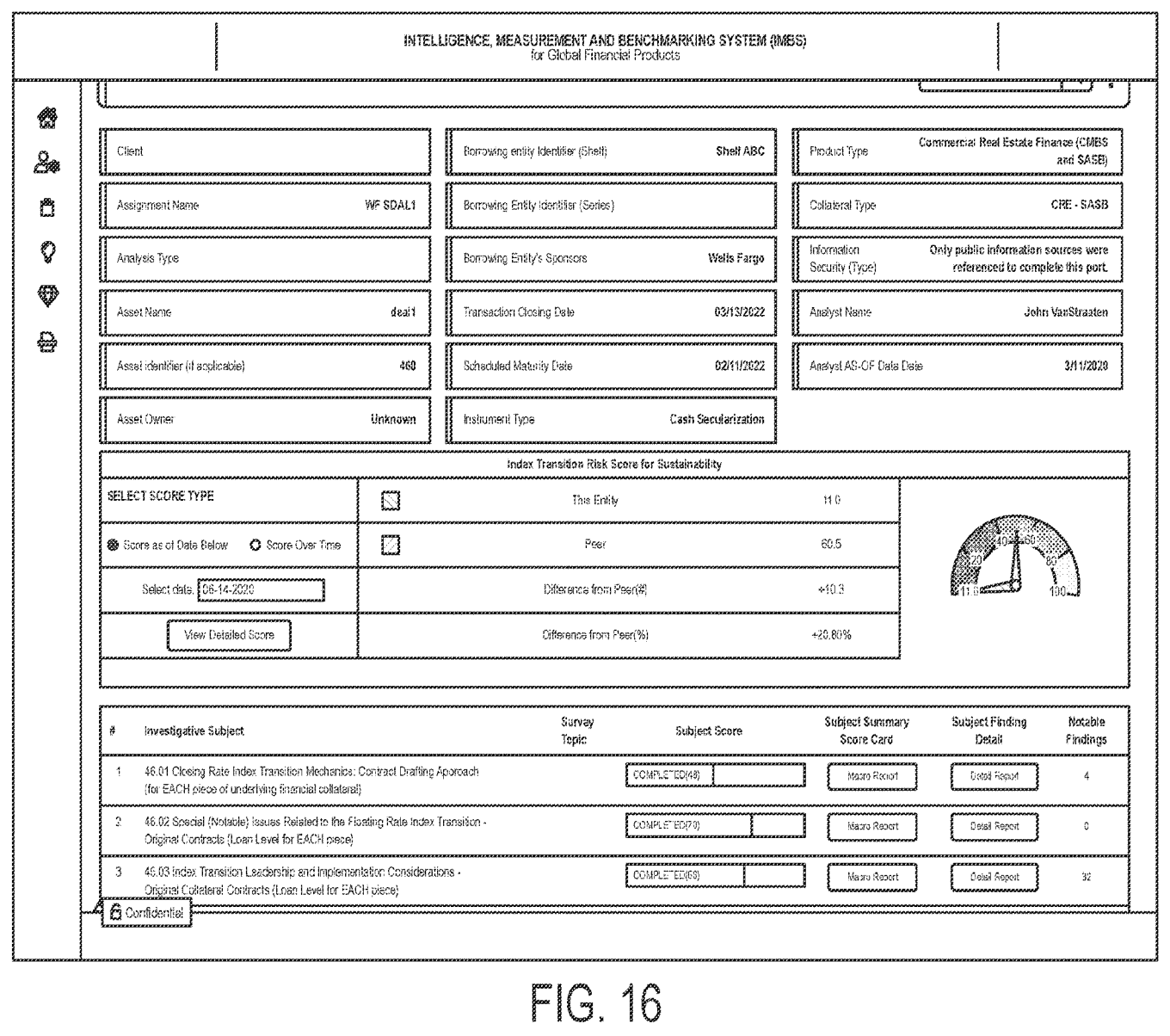
Figure 18:
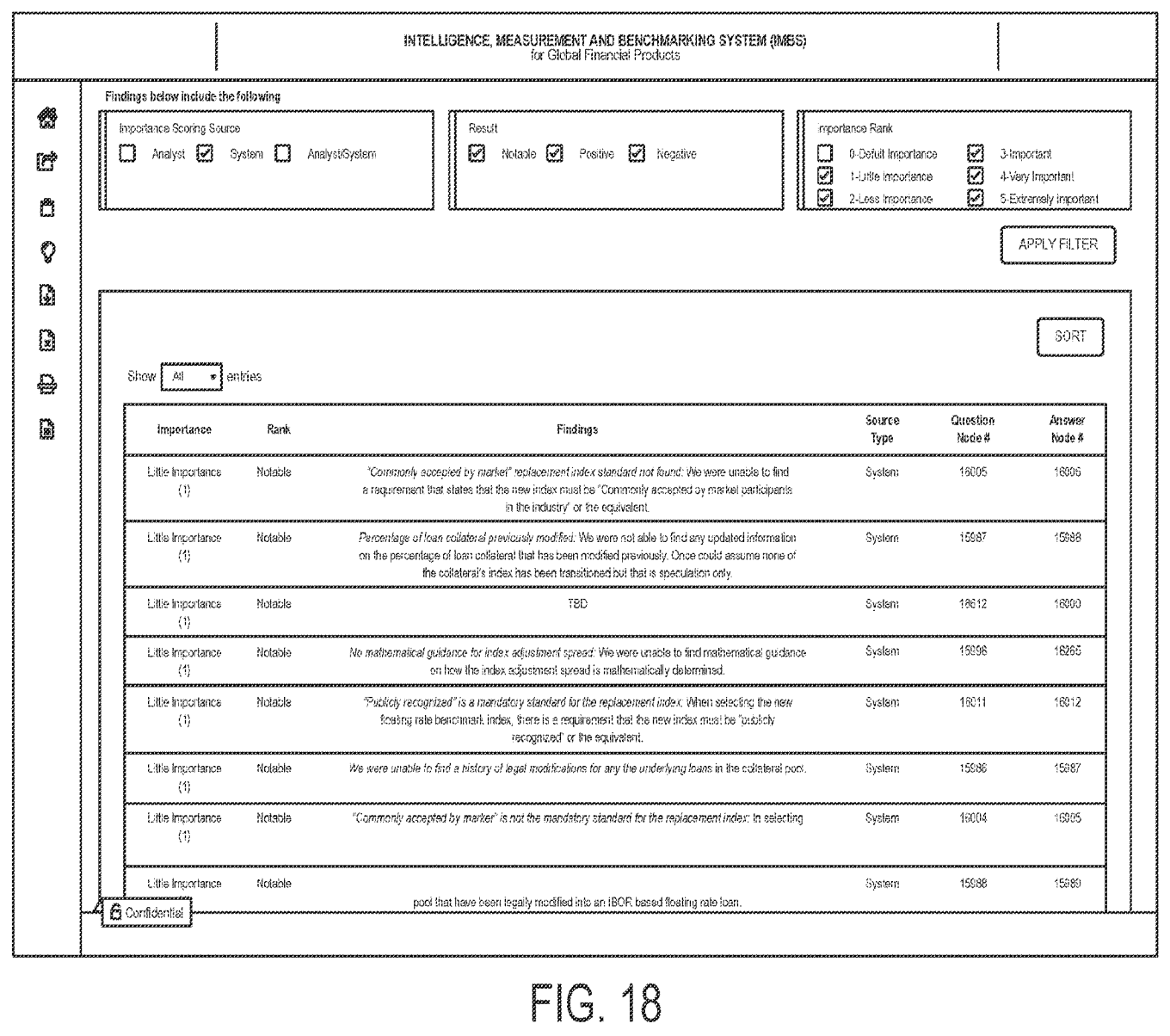
Figure 19:

FIGS. 16-19 show examples of screen shots that can be displayed to an analyst and/or administrator following completion of the survey for a transaction. FIGS. 16 and 17 are part of a single screen that the user might need to scroll through. The middle part of FIG. 16 shows a "speedometer" gauge that shows the composite risk score for the transaction as well as how it compares to peer transactions both in terms of the point difference and the percentage difference. The bottom of FIG. 16 and continuing to FIG. 17 shows the score for each topic/chapter in the survey. The scores are shown with both numbers and bar graphs. The user interface can also include links where the user (e.g., analyst or administrator) can click to get detailed reports (e.g., the survey query responses) for the particular topics in the survey. The user interface can also include a count of the number of "notable findings" in each topic (e.g., see field 84 of FIG. 8). To that end, FIG. 18 is a screen shot that tabulates the "notable findings" and includes the importance rank assigned to each notable finding by the analyst. FIG. 19 show the composite score for the transaction (in this example, a score of "66"). This page, for example, can be exported to be included with the paperwork for the transaction so that the parties are aware of the objectively-scored risk.

The benchmarking and scoring system 22 may be implemented with one or a number of network computers, such as servers, mainframes, PCs, PDAs etc. Each computer of the scoring system 22 may comprise one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.), near line and/or off-line storage. The scoring system 22 may be programmed to perform the functions described herein with software that is stored in the primary, secondary, near line and/or off-line data storage and executed by the processor(s) of the scoring system 22. For example, software for the OCR component 30 and the document similarity comparison module 31 may be stored in the data storage and executed by the processor(s). The computer software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

In one general aspect, therefore, the present invention is directed to computer systems and computer-implemented methods for providing an improved, efficient graphical user interface (GUI) to an analyst tasked with reviewing one or more transactional documents of a transaction for risk. In various implementations, the computer system comprises (i) an analyst computer device that comprises a browser program; and (ii) a back-end computer system that is in communication with the analyst computer device. The back-end computer system comprises: (a) a transaction document database that stores the one or more transactional documents of the transaction in word-searchable form; (b) a query database that stores pre-determined queries for the analyst to investigate in the one or more transactional documents for the transaction, where the for at least some of the pre-determined queries, the query database also stores corresponding suggestions in the one or more transaction documents for the analyst to review to respond to the query, and where the suggestions are based on prior reviews of transactional documents for similar type transactions; and (c) a web-server for serving interactive webpages to the analyst computer device that are displayed by the browser of the analyst computer device, where the interactive webpages comprise an interactive query node tree webpage that display an interactive query node tree.

In various implementations, each query node in the interactive query node tree corresponds to a separate query designed to assess risk for the transaction and wherein each query node comprise a hyperlink. Also, upon the analyst activating the hyperlink for a first query node in the interactive query node tree webpage, a corresponding query for first query node is displayed in a first query webpage.

The first query webpage can comprises means for the analyst to enter a response to the first query; an evidence field for the analyst to cite a citation in the one or more transactional documents that supports the response to the first query; a suggestion field suggesting one or more places in the one or more transactional documents for the analyst review to determine the response to the first query; and a next query selection button that, when activated by the analyst, cause a second query webpage to be displayed to the analyst, where the query for the second query webpage depends on the response by the analyst to the first query.

The second query webpage can similarly comprise: means for the analyst to enter a response to the second query; the evidence field for the analyst to cite a citation in the one or more transactional documents that supports the response to the second query; the suggestion field suggesting one or more places in the one or more transactional documents for the analyst review to determine the response to the second query; and the next query selection button that, when activated by the analyst, causes a third query webpage to be displayed to the analyst. The means for the analyst to enter the responses for the first and second queries (and any other queries) can comprise radio buttons, drop down menus, free text fields, HTML checkboxes, HTML select fields, etc. The back-end computer system is further configured to compute and display (or caused to be display on a computer device (e.g., analyst, administrator, supervisor computer device in communication with the back-end computer system)) an overall risk score for the transaction based on the analyst's responses to queries in the query node tree.

In various implementations, the computer system further comprises an administrator computer device that is in communication with the back-end computer system, where the administrator computer device comprises a browser for displaying administrator webpages provided by the web server of the back-end computer system, where the administrator webpages comprise user interfaces through which an administrator specifies the queries for each query node of the query node tree and an associated query score for possible responses for each query node, and where the back-end computer system is configured to compute the overall risk score based on the associated query scores for the responses provided by the analyst to the queries.

In other various implementations, the query tree node specifies a progression of query nodes. Also, the first query webpage may include an additional field through which the analyst is permitted to flag that an issue related to the first query is important to the risk assessment. The additional field may further permit the analyst to enter an importance score for the first query. Still further, the back-end computer system may be configured to generate a final risk assessment for the transaction, where the final risk assessment comprises the overall risk score for the transaction and a list of issues flagged by the analyst as important to the risk assessment.

In various implementations, the back-end computer system is configured to store the analyst's citations in the evidence fields and use the analyst's citations in the evidence fields as suggestions in a subsequent risk assessment analysis for a second, similar-type transaction. Additionally, the back-end computer system may be further configured to compare a passage of the one or more transaction documents to a transaction document from a different, similar transaction to determine the one or more places in the one or more transactional documents specified in the evidence field for the analyst to review to determine the response to the first query. In addition, the back-end computer system comprises an OCR module to OCR the one or more transaction documents to make the one or more transaction documents word searchable.

The user interface provided by the present invention provides many advantages over existing techniques for reviewing transaction documents for risk, including in terms of efficiency. By having the progression of queries determine a priori according to the query node tree, the analysts can efficiently progress from relevant query to relevant query without getting bogged down in irrelevant queries in the often very complex transaction documents that are often written in a style that is difficult for a human to review and comprehend. Also, by including the suggested citations for where the analyst should look to find a response to the query, the user interface accelerates the review process. This feature greatly accelerates the time to review the complex transaction documents. Also, by storing the analyst's responses and evidence citations, the system administrators can improve the queries and the query flow (e.g., the progression of the node tree) as part of a feedback loop to make the analysis qualitatively better and more efficient for the analysts. Also, the user interface is rooted in technology. For example, it can utilize word-searchable electronic documents; it can include an OCR module for converting non-word searchable documents to a word-searchable form; it can utilize interactive web pages to present the queries, capture the analysts' responses in an efficient manner, and implement the query flow. Also, where the comparison module 31 computes that a responsive passage of the transaction documents being reviewed are very similar to prior, similar, transaction documents, and the responses to a query in those prior transactions were consistently uniform, the system can deduce that the uniform response from the prior analyses is the proper response to the query, and automatically enter the response and move to the next query in node tree, thereby accelerate the review time of the analyst in completing the query node tree. Also, the possible responses can be sorted by likelihood, so that the most likely responses are listed first (higher), which also facilitates the analyst's investigation. These and other benefits and technology features realizable through the present invention are apparent from the description herein.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments might occur to persons skilled in the art with attainment of at least some of the advantages. For example, additional applications for the above-described system could be applicable to but not be limited to the medical, judicial or behavioral science fields. The disclosed embodiments are therefore intended to include all such modifications, alterations, and adaptations without departing from the scope of the embodiments as set forth herein.

What is claimed is:

1. A computer system for monitoring one or more transactional documents of a first transaction for changing risk profiles relative to prior transactions of a similar type, the computer system comprising:

an analyst computer device for an analyst that is tasked with analyzing the transactional documents of the first transaction for risk to parties to the first transaction, wherein the analyst computer device comprises is configured to display a graphical user interface (GUI) for the analyst to analyze the transaction documents; and a back-end computer system that is in communication with the analyst computer device, wherein the back-end computer system comprises:

a transaction document database that stores the one or more transactional documents of the first transaction in word-searchable form, wherein the back-end computer system comprises an OCR component for converting transactional documents that are not word-searchable to word-searchable form, wherein the OCR component identifies individual characters in the transactional documents and identifies equivalent plain text characters for the identified individual characters using matrix matching and/or feature extraction;

a query database that stores pre-determined queries for the analyst to investigate in the one or more transactional documents for the first transaction, wherein for at least some of the pre-determined queries, the query database also stores corresponding suggestions in the one or more transactional documents for the analyst to review to respond to the query, wherein the suggestions are based on prior reviews of transactional documents for prior transactions that are similar to the first transaction; and a back-end server for serving interactive query node tree displays to the analyst computer device that are displayed by the analyst computer device, wherein the interactive query node tree displays comprise an interactive query node tree display that displays an interactive query node tree, wherein:

each query node in the interactive query node tree corresponds to a separate query designed to assess risk for the first transaction and wherein each query node comprises a hyperlink;

upon the analyst activating the hyperlink for a first query node in the interactive query node tree display, a corresponding query for first query node is displayed for the analyst in a first query display, wherein the first query display further comprises:

means for the analyst to enter a response to the first query;

an evidence field for the analyst to cite a citation in the one or more transactional documents that supports the response to the first query;

a suggestion field suggesting one or more places in the one or more transactional documents for the analyst to review to determine the response to the first query; and a next query selection button that, when activated by the analyst, causes a second query display to be displayed to the analyst, wherein the query for the second query display depends on the response by the analyst to the first query, and the second query display comprises:
means for the analyst to enter a response to the second query;
the evidence field for the analyst to cite a citation in the one or more transactional documents that supports the response to the second query;
the suggestion field suggesting one or more places in the one or more transactional documents for the analyst to review to determine the response to the second query; and
the next query selection button that, when activated by the analyst, causes a third query display to be displayed to the analyst,
wherein the back-end computer system is configured to compute and display an overall risk score for the first transaction based on the analyst's responses to queries in the query node tree, and wherein the back-end computer system further comprises a document scoring module for identifying the one or more places in the one or more transactional documents for the first transaction to display in the suggestion fields for first and second query nodes, wherein the document scoring module comprises:
a document similarity comparison module for:
comparing a first passage responsive to the first query node of the one or more transactional documents for the first transaction to a first passage in a second transactional document stored in the transaction document database for a second transaction, wherein the first passage in the second transactional document is responsive to the first query node for the second transaction and the second transaction is a similar type of transaction to the first transaction, to identify the one or more places in the one or more transactional documents to display in the suggestion field for the first query node; and
comparing a second passage responsive to the second query node of the one or more transactional documents to a second passage in the second transactional document, wherein the second passage in the second transactional document is responsive to the second query node for the second transaction, to identify the one or more places in the one or more transactional documents for the first transaction to display in the suggestion field for the second query node,
wherein:
the document similarity comparison module uses cosine similarity scores to compare the passages of the first and second transactional documents;
the query database stores citations of the analyst in the evidence fields for the first and second query nodes to store as possible suggestions in the suggestion fields for the first and second query nodes for assessing transaction risk of a future transaction with the computer system;
the means for the analyst to enter the response to the first query provides a suggested response to the first query upon a determination by the document similarity comparison module that a similarity score for the first passage responsive to the first query node of the one or more transactional documents for the first transaction to the first passage in the second transactional document exceeds a threshold similarly score for the first query node; and
the means for the analyst to enter the response to the second query provides a suggested response to the second query upon a determination by the document similarity comparison module that a similarity score for the second passage responsive to the second query node of the one or more transactional documents for the first transaction to the second passage in the second transactional document exceeds a threshold similarly score for the second query node.

2. The computer system of claim 1, further comprising an administrator computer device that is in communication with the back-end computer system, wherein the administrator computer device is for displaying administrator displays provided by the back-end server of the back-end computer system, wherein the administrator displays comprise user interfaces through which an administrator specifies the queries for each query node of the query node tree and an associated query score for possible responses for each query node, wherein the back-end computer system is configured to compute the overall risk score based on the associated query scores for the responses provided by the analyst to the queries.

3. The computer system of claim 1, wherein the query node tree specifies a progression of query nodes.

4. The computer system of claim 1, wherein the first query display includes an additional field through which the analyst is permitted to flag that an issue related to the first query is important to the risk assessment.

5. The computer system of claim 4, wherein the additional field further permits the analyst to enter an importance score for the first query.

6. The computer system of claim 5, wherein the back-end computer system is configured to generate a final risk assessment for the first transaction, wherein the final risk assessment comprises the overall risk score for the first transaction and a list of issues flagged by the analyst as important to the risk assessment.

7. A method of monitoring one or more transactional documents of a first transaction for changing risk profiles relative to prior transactions of a similar type, the method comprising:
storing, in a transaction document database of a back-end computer system, the one or more transactional documents of the first transaction in word-searchable form, wherein storing the one or more transactional documents comprises converting transactional documents that are not word-searchable to word-searchable form through optical character recognition (OCR), wherein converting the transactional documents to word-search form comprises identifying individual characters in the transactional documents and identifying equivalent plain text characters for the identified individual characters using matrix matching and/or feature extraction;
storing, in a query database of the back-end computer system, pre-determined queries for an analyst to investigate in the one or more transactional documents for the first transaction, wherein for at least some of the pre-determined queries, the query database also stores corresponding suggestions in the one or more transaction documents for the analyst to review to respond to the query, wherein the suggestions are based on prior reviews of transactional documents for prior transactions that are similar to the first transaction; and serving, by a web-server of the back-end computer system, interactive displays to an analyst computer device that is in communication with the back-end computer system, wherein the interactive displays are for display by the analyst computer device, wherein the interactive displays comprise an interactive query node tree display that display an interactive query node tree, wherein:
- each query node in the interactive query node tree corresponds to a separate query designed to assess risk for the first transaction and wherein each query node comprises a hyperlink;
- upon the analyst activating the hyperlink for a first query node in the interactive query node tree display, a corresponding query for first query node is displayed in a first query display, wherein the first query display further comprises:
  - means for the analyst to enter a response to the first query;
  - an evidence field for the analyst to cite a citation in the one or more transactional documents that supports the response to the first query;
  - a suggestion field suggesting one or more places in the one or more transactional documents for the analyst to review to determine the response to the first query; and
  - a next query selection button that, when activated by the analyst, cause causes a second query display to be displayed to the analyst, wherein the query for the second query display depends on the response by the analyst to the first query, and
  - the second query display comprises:
    - means for the analyst to enter a response to the second query;
    - the evidence field for the analyst to cite a citation in the one or more transactional documents that supports the response to the second query;
    - the suggestion field suggesting one or more places in the one or more transactional documents for the analyst to review to determine the response to the second query; and
    - the next query selection button that, when activated by the analyst, causes a third query display to be displayed to the analyst;

identifying, by a document scoring module of the back-end computer system, the one or more places in the one or more transactional documents for the first transaction to display in the suggestion fields for first and second query nodes, wherein identifying the one or more places comprises, with a document similarity comparison module of the document scoring module:
- comparing a first passage responsive to the first query node of the one or more transactional documents for the first transaction to a first passage in a second transactional document stored in the transaction document database for a second transaction, wherein the first passage in the second transactional document is responsive to the first query node for the second transaction and the second transaction is a similar type of transaction to the first transaction, to identify the one or more places in the one or more transactional documents to display in the suggestion field for the first query node; and
- comparing a second passage responsive to the second query node of the one or more transactional documents to a second passage in the second transactional document, wherein the second passage in the second transactional document is responsive to the second query node for the second transaction, to identify the one or more places in the one or more transactional documents for the first transaction to display in the suggestion field for the second query node, wherein:
  - the document similarity comparison module uses cosine similarity scores to compare the passages of the first and second transactional documents;
  - the query database stores the analyst's citations in the evidence fields for the first and second query nodes to store as possible suggestions in the suggestion fields for the first and second query nodes for assessing transaction risk of a future transaction with the computer system;
  - the means for the analyst to enter the response to the first query provides a suggested response to the first query upon a determination by the document similarity comparison module that a similarity score for the first passage responsive to the first query node of the one or more transactional documents for the first transaction to the first passage in the second transactional document exceeds a threshold similarly score for the first query node; and
  - the means for the analyst to enter the response to the second query provides a suggested response to the second query upon a determination by the document similarity comparison module that a similarity score for the second passage responsive to the second query node of the one or more transactional documents for the first transaction to the second passage in the second transactional document exceeds a threshold similarly score for the second query node;

computing, by the back-end computer system, an overall risk score for the first transaction based on the analyst's responses to queries in the query node tree; and displaying, by an administrator computer device that is in communication with the back-end computer system, the overall risk score.

8. The method of claim 7, further comprising displaying, by the administrator computer device, administrator displays provided by the web server of the back-end computer system, wherein the administrator displays comprise user interfaces through which an administrator specifies the queries for each query node of the query node tree and an associated query score for possible responses for each query node, wherein the back-end computer system is configured to compute the overall risk score based on the associated query scores for the responses provided by the analyst to the queries.

9. The method of claim 7, wherein the query node tree specifies a progression of query nodes.

10. The method of claim 7, wherein the first query display includes an additional field through which the analyst is permitted to flag that an issue related to the first query is important to the risk assessment.

11. The method of claim 10, wherein the additional field further permits the analyst to enter an importance score for the first query.

12. The method of claim 11, further comprising generating, by the back-end computer system, a final risk assessment for the first transaction, wherein the final risk assessment comprises the overall risk score for the first transaction and a list of issues flagged by the analyst as important to the risk assessment.

* * * * *